United States Patent [19]

Iizuka et al.

[11] Patent Number: 5,596,424
[45] Date of Patent: Jan. 21, 1997

[54] SCANNING OPTICAL SYSTEM HAVING IMAGE FORMING OPTICAL SYSTEM AND READING OPTICAL SYSTEM WITH AT LEAST ONE COMMON OPTICAL COMPONENT

[75] Inventors: Takashi Iizuka; Yoshihiro Yamazaki, both of Tokyo, Japan

[73] Assignee: Asahi Kogaku Kogyo Kabushiki Kaisha, Tokyo, Japan

[21] Appl. No.: 183,810

[22] Filed: Jan. 21, 1994

[30] Foreign Application Priority Data

Jan. 20, 1993 [JP] Japan ................................ 5-026074
Jan. 19, 1994 [JP] Japan ................................ 6-18922

[51] Int. Cl.⁶ ............................ H04N 1/04; H04N 1/207
[52] U.S. Cl. .................... 358/474; 358/481; 358/296; 358/300; 359/204
[58] Field of Search ............................ 358/401, 474, 358/480, 481, 494, 300, 302, 296, 298; 359/204, 216, 212; 250/236, 235

[56] References Cited

U.S. PATENT DOCUMENTS

| | | | |
|---|---|---|---|
| 3,889,057 | 6/1975 | Perreault et al. | 358/300 |
| 4,012,585 | 3/1977 | Chen | 358/481 |
| 4,130,841 | 12/1978 | Walsh et al. | 358/298 |
| 4,268,868 | 5/1981 | Yokota et al. | 358/480 |
| 4,370,678 | 1/1983 | Kitamura | 358/480 |
| 4,386,374 | 5/1983 | Kimoto | 358/480 |
| 4,488,042 | 12/1984 | Clay et al. | |
| 4,573,084 | 2/1986 | Iida | 358/300 |
| 4,586,089 | 4/1986 | Nakazato et al. | 358/481 |
| 4,841,147 | 6/1989 | Saotome | 358/302 |
| 4,863,250 | 9/1989 | Ishizuka . | |
| 4,868,377 | 9/1989 | Nishikawa . | |
| 4,930,850 | 6/1990 | Morimoto . | |
| 4,953,926 | 9/1990 | Morimoto . | |
| 4,968,876 | 11/1990 | Iima . | |
| 5,009,472 | 4/1991 | Morimoto . | |
| 5,043,569 | 8/1991 | Iima et al. . | |
| 5,055,663 | 10/1991 | Morimoto et al. . | |
| 5,130,840 | 7/1992 | Iima et al. . | |
| 5,189,546 | 2/1993 | Iizuka . | |
| 5,194,981 | 3/1993 | Morimoto . | |

FOREIGN PATENT DOCUMENTS 59-193413  11/1984  Japan .

*Primary Examiner*—Scott A. Rogers
*Attorney, Agent, or Firm*—Greenblum & Bernstein P.L.C.

[57] ABSTRACT

A scanning optical system having an image forming optical system for emitting a scanning beam modulated in accordance with image information onto a destination surface. The scanning optical system further includes a reading optical system for receiving light reflected from an object surface to obtain image information from the object surface. Both systems make use of at least one common optical component, for example, a polygonal mirror, a cylindrical mirror, a common optical path or a toric lens.

78 Claims, 31 Drawing Sheets

FIG. 7A
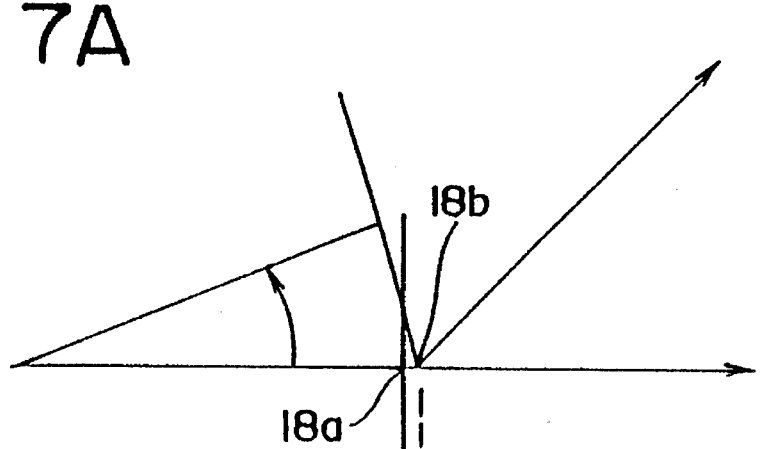
FIG. 7B
FIG. 7C
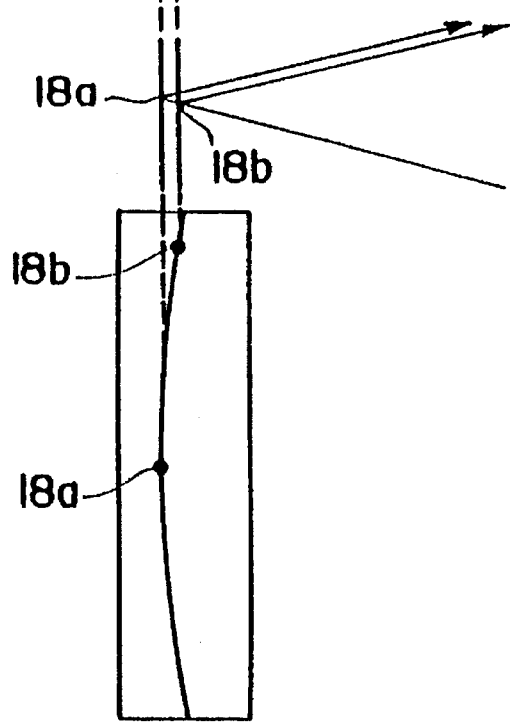

F I G. 16
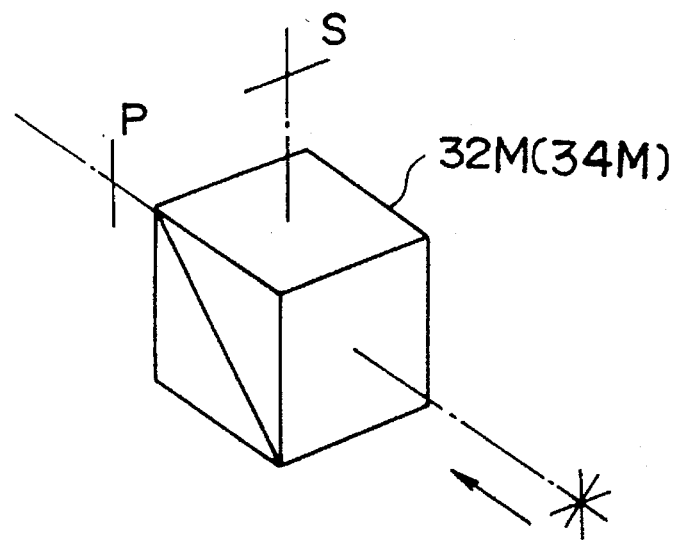
F I G. 17
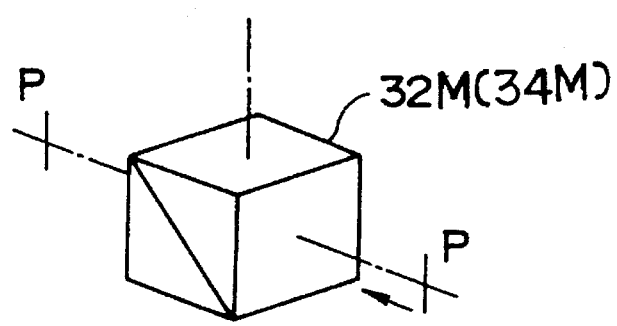

F I G. 21
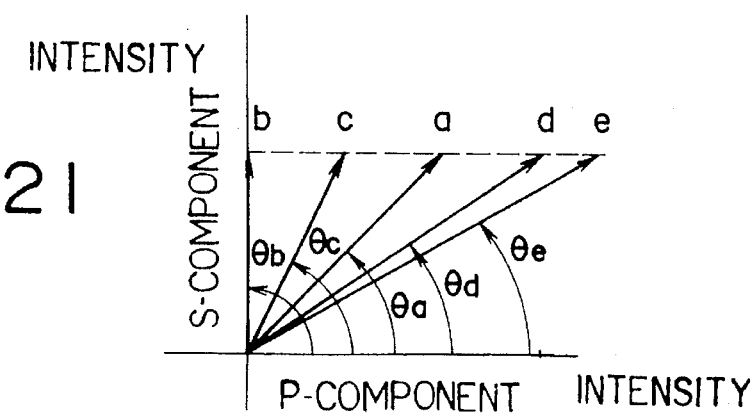
F I G. 22
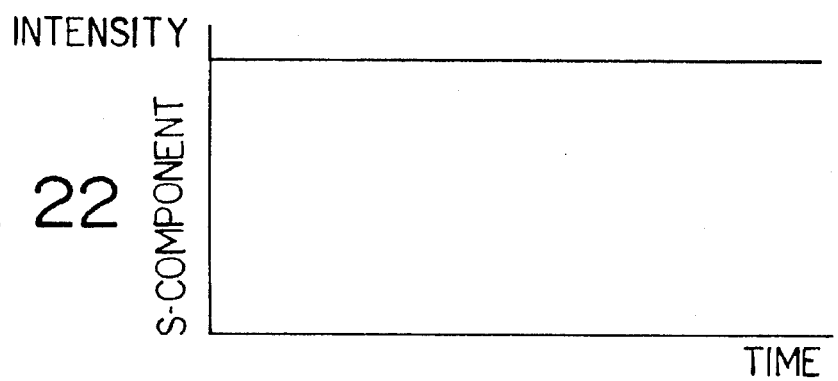
F I G. 23
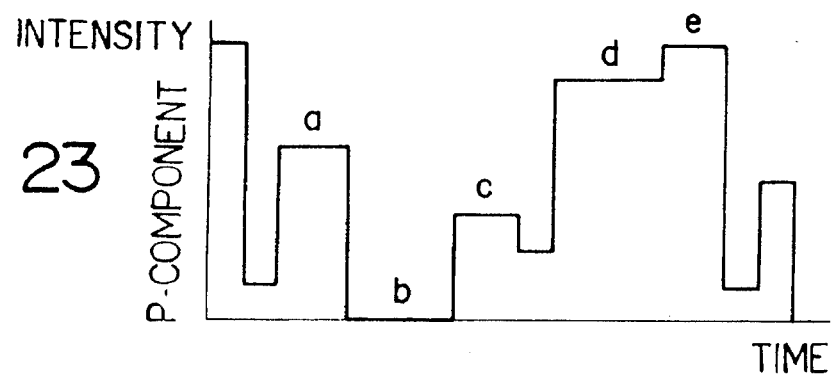

F I G. 34
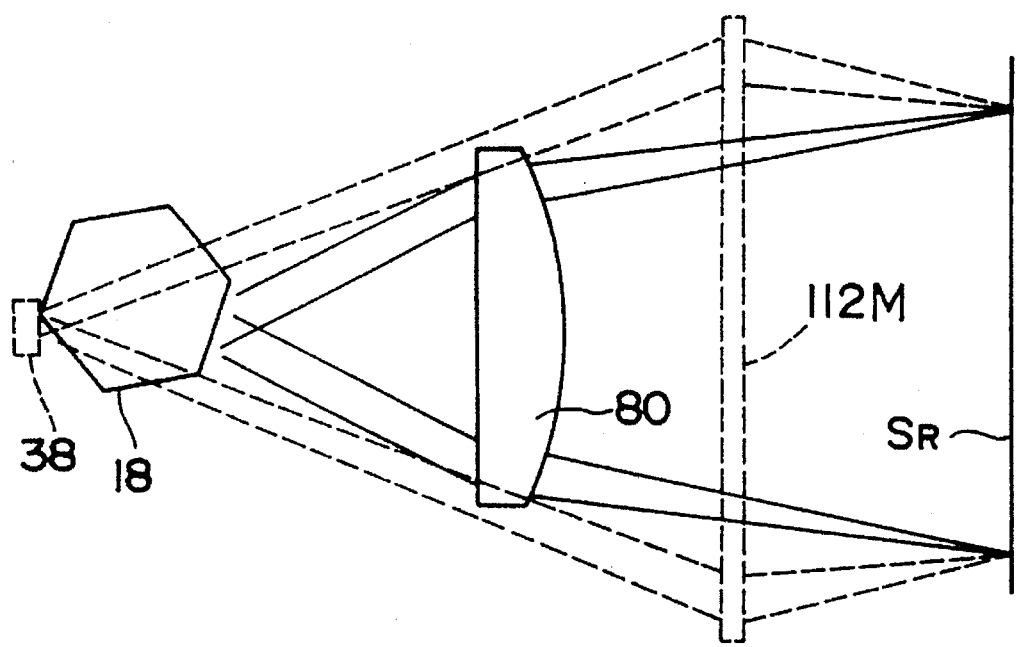

F I G. 36
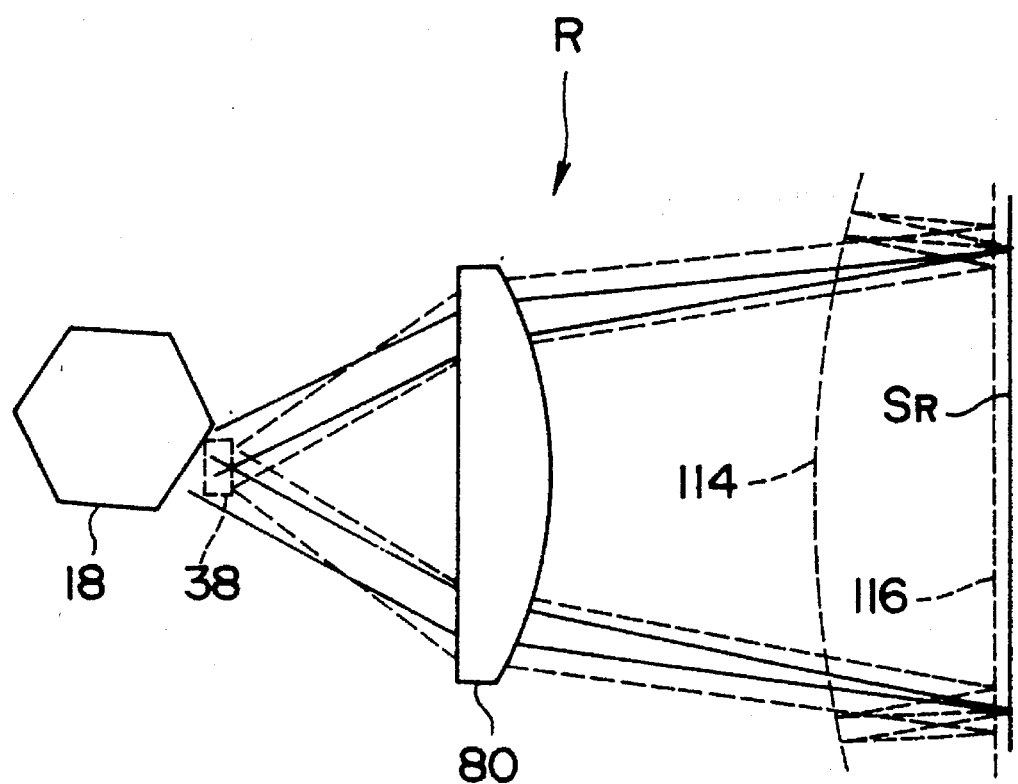

SCANNING OPTICAL SYSTEM HAVING IMAGE FORMING OPTICAL SYSTEM AND READING OPTICAL SYSTEM WITH AT LEAST ONE COMMON OPTICAL COMPONENT

BACKGROUND OF THE INVENTION

The present invention relates to a scanning optical system including a reading optical system for reading information on an object surface and an image forming optical system for forming an image on a destination surface such as a photoconductive surface.

Conventionally, a reading optical system as described below has been known. In the reading optical system, an object surface to be read, or scanned is illuminated by a lamp such as a fluorescent lamp. The light reflected on the object surface is directed to a sensor such as a CCD (Charge Coupled Device) line sensor through a converging lens, projection lens and the like. The line sensor thus outputs an image information corresponding to one scanning line of the image on the object surface. At the same time, the surface is relatively moved in the direction perpendicular to the direction of the line sensor. Thus, the reading optical system obtains a two-dimensional image information of the object surface.

With respect to an image forming optical system, an electrophotographic imaging method as described below is well known. In the image forming optical system, a laser beam carrying an image information is deflected by a polygonal mirror in order to scan a charged photoconductive surface of a photoconductive drum in a direction of the rotational axis of the photoconductive drum (main scanning). As the main scanning is being performed, the photoconductive drum is rotated (auxiliary scanning) so that the circumferential surface of the photoconductive drum is scanned by the deflected laser beam. Thus, the image forming optical system forms a latent image on the photoconductive surface of the photoconductive drum.

The latent image formed on the circumferential surface of the photoconductive drum is developed, i.e., a toner is applied to the latent image to form a toner image. The toner image is transferred onto a recording sheet, and fixed thereonto.

In an apparatus which is required to have an image reading function and an image forming function, e.g., a facsimile machine or a digital copy machine, two different optical systems: the reading optical system; and the image forming optical system should be provided. In such an apparatus, improvement has been desired to reduce the entire size of the apparatus, and to decrease the manufacturing cost thereof.

SUMMARY OF THE INVENTION

It is therefore an object of the invention to provide a scanning optical system including both the reading optical system and the image forming optical system, which is capable of being made compact and inexpensive.

It is another object of the present invention to provide a scanning optical system having a reading optical system and an image forming optical system that are capable of being operated simultaneously and independently of each other.

The instant invention includes a scanning optical system, comprising an image forming optical system for emitting a scanning beam modulated in accordance with an image information onto a destination surface, and a reading optical system for receiving light emitted from an object surface to obtain an image information of the object surface; wherein at least one optical element is used both in the image forming optical system and in the reading optical system.

The image forming optical system includes a laser source for emitting a laser beam carrying image information, and the reading optical system includes a light source, which may be a laser source, for illuminating the object surface.

The scanning optical system further includes means for combining the laser beam of the image forming optical system and the laser beam of the reading optical system, and means for dividing the combined laser beams into respective laser beams.

The laser beam of the image forming optical system and the laser beam of the reading optical system have different wavelengths, and each of the combining means and the separating means has at least one beam splitter for selectively allowing a beam to pass through or reflecting the beam in accordance with the wavelength of the beam.

Further, the image forming laser beam and the illuminating laser beam may be polarized in different respective directions, and then each of the combining means and the separating means includes at least one beam splitter for selectively allowing a beam to pass through or reflecting the beam in accordance with the polarized direction of the beam.

Still further, the light source of the reading optical system may output light having a plurality of wavelengths. The light source may, for example, comprise a fluorescent lamp.

Still further, the light source may comprise another laser source for outputting a plurality of laser beams to be combined with a plurality of laser beams having different wavelengths, respectively.

In another embodiment, the scanning optical system includes an image forming optical system having a light source for outputting a modulated beam which is modulated in accordance with image information, wherein the reading optical system includes another light source for outputting an illuminating beam for illuminating the object surface, and wherein a deflection mirror is provided for deflecting the modulated beam as well as the illuminating beam.

Further, the scanning optical system may include at least one optical element comprising at least one common element located between the deflection mirror and the destination surface in the image forming optical system, and located between the deflection mirror and the object surface in the reading optical system. The at least one common element may also include an fθ lens. Further, the at least one common element may also include a curved mirror which functions as an fθ lens.

Still further, the at least one common element may include an anamorphic lens provided between the curved mirror and the destination surface in the image forming optical system. In this case, an optical axis of the anamorphic lens is displaced with respect to an optical axis of the image forming optical system.

The curved mirror may be provided with an ambient light absorbing means.

The scanning optical system may comprise a single laser source, wherein the single laser source is used for the light source in the image forming optical system, and as the light source in the reading optical system. In this case, the single laser source outputs a modified laser beam for forming an image, and outputs an unmodified laser beam for illuminating the object surface.

Further, the scanning optical system according to the aforementioned embodiment comprises switching means for switching the optical path of the laser beam outputted by the single laser source in accordance with whether the single laser source is used in the image forming optical system or in the reading optical system.

Further yet, the scanning optical system may comprise means for polarizing the beam emitted by the single laser source in different directions depending on whether the laser source is used in the image forming optical system or in the reading optical system and means for changing an optical path of a beam in accordance with the polarized direction of the beam incident thereto.

The image forming optical system may include means for modulating a laser beam emitted by the single laser source with respect to a predetermined polarized direction thereof. Further, provided are means for separating the laser beam for the image forming optical system and the laser beam for the reading optical system incident thereto which are being combined.

The separating means may comprise a beam splitter for allowing an incident beam to pass through or reflecting the same in accordance with the polarized direction thereof.

The reading optical system further comprises means for receiving light from the object surface.

Still further, the reading optical system may comprise a light source for emitting an illuminating beam for illuminating the object surface, along a common optical path, wherein the illuminating light and the light reflected by the object surface pass along the common optical path.

Further yet, the reading optical system may comprise means for changing the direction of the light reflected by the object surface passed through the optical path so as to be directed to the light receiving means. The changing means may comprise a mirror member having a transparent portion which allows the illuminating beam to pass through, and a reflection portion for reflecting the light from the object surface toward the light receiving member. A lens may be inserted in an optical path between the object surface and the light receiving means to converge the light reflected by the object surface towards the light receiving means. Still further, a light shielding member may be located at a conjugate position with respect to the object surface, to inhibit light not from the object surface from being incident to the light receiving means.

Preferably, a scanning optical system, according to the present invention, comprises an image forming optical system for emitting a scanning beam modulated in accordance with an image information onto a destination surface; and a reading optical system for receiving light emitted from an object surface to obtain an image information of the object surface, wherein a predetermined optical path and at least one optical element is used either in the image forming optical system or in the reading optical system. The at least one optical element may comprise a deflection mirror for deflecting a beam incident thereto. Further, the at least one optical element may include a curved mirror for reflecting the beam deflected by the deflection mirror towards the destination surface, with the curved mirror having power in a direction where the scanning beam scans the beam reflected by the curved mirror having a predetermined angle with respect to a beam incident thereto in the direction perpendicular to the direction in which the scanning beam scans.

The image forming optical system may comprise a light source for emitting a laser beam modulated by the image information, and the reading optical system may include another light source for emitting another laser beam for illuminating the object surface.

Each of the light sources may emit a laser beam having a single wavelength.

Further, the light source of the image forming optical system may emit a plurality of beams having different wavelengths and having respective image information, and another light source may emit a plurality of beams having different wavelengths, and the destination surface may have sensitivity for a plurality of wavelengths so that a color image can be formed. The reading optical system may comprise means for separating the light from the object surface into a plurality of lights having respective wavelengths, and a plurality of sensor members may be provided for receiving the plurality of lights. The light from the object surface then proceeds along the same optical path as the another laser beam proceeds, and the reading optical system may include a first beam splitter for spatially separating the light from the object surface, from the optical path along which the light proceeds.

The reading optical system may comprise a second beam splitter for combining the laser beam and the another laser beam to a combined beam, and a third beam splitter for dividing the combined beam back into the laser beam and the another laser beam. The light source emits a laser beam having a first predetermined wavelength, and the another light source emits another laser beam having a second predetermined wavelength. Each of the second and third beam splitters allows a beam to pass through or reflects the same in accordance with the wavelength of the beam incident thereto. The second and third beam splitters allow a beam having a first predetermined wavelength to pass through, and reflect a beam having a second predetermined wavelength.

Also, the light source may emit a laser beam polarized in a first polarization direction, and the another light source may emit a laser beam polarized in a second polarization direction, and the second and third beam splitters selectively allow a beam to pass through or reflect the same in accordance with the polarized direction thereof. Accordingly, the second and third beam splitters allow a beam polarized in the first polarization direction to pass through, and reflect a beam polarized in the second polarization direction.

The aforementioned single optical element may comprise a laser source capable of emitting the laser beam and the another laser beam. The laser source may comprise a light source for emitting a laser beam polarized in a first polarization direction, and modulating means for modulating the laser beam emitted by the laser source to have a component polarized in a second polarization direction. The component in the second polarization direction is modulated in accordance with the image information.

The light reflected from the object surface may proceed along the same optical path which the another laser beam proceeds, and the reading optical system may comprise a first beam splitter for spatially separating the light reflected from the object surface from the optical path along which the light proceeds. The reading optical system may further include a second beam splitter which selectively allows a beam to pass through or reflects the same in accordance with the polarized direction thereof.

The second beam splitter reflects a beam polarized in the first polarization direction, and allows a beam polarized in the second polarization direction to pass therethrough.

In another embodiment, the scanning optical system comprises an image forming optical system for emitting a scanning beam modulated in accordance with an image information onto a destination surface; a reading optical system for receiving light emitted from an object surface to obtain an image information of the object surface, wherein the image forming optical system and the reading optical system are selectively used; and means for switching an optical path depending on whether the image forming optical system is used or the reading optical system in used, wherein a predetermined optical path and at least one optical element is commonly used in both the image forming optical system and the reading optical system. The at least one optical element may comprise a deflection mirror for deflecting a beam incident thereto. The at least one optical element may comprise a curved mirror for reflecting the beam deflected by the deflection mirror towards the destination surface. The curved mirror has a power in a direction along which the scanning beam scans, and the beam reflected by the curved mirror has a predetermined angle with respect to a beam incident thereto in the direction perpendicular to the direction in which the scanning beam scans.

Still further, a single optical element may comprise a laser source capable of selectively emitting the laser beam and the another laser beam.

The switching means may include a movable member capable of being moved between a reading position where said movable member directs said laser beam to said object surface, and an image forming position where said movable member directs said laser beam to said destination surface. The movable member is located at the image forming position when the light source emits the laser beam, and is located at the reading position when the light source emits the another laser beam.

The light source may emit a beam polarized in a first polarization direction, wherein the scanning optical system further comprises polarization changing means provided between the deflection mirror and the light source, for changing the polarized direction of a light source beam such that when one of the laser beam or the another laser beam is emitted, the polarized direction of the laser beam emitted by the light source is not changed, and when the other of the laser beam and the another laser beam is emitted, the polarized direction of the laser beam is changed to a second polarized direction. The scanning optical system further comprises a beam splitter provided between the deflection mirror and the destination surface, wherein the beam splitter allows a laser beam polarized in one of the first direction or the second direction to pass through, and reflects the laser polarized in the other of the first and second directions.

Further yet, the at least one optical element may comprise an fθ lens.

The reading optical system may comprise light receiving means for receiving the light emitted from the object surface through an anamorphic lens, the optical path of which is different from the path of the another laser beam. The light receiving means may include a fluorescent fiber for receiving light to generate fluorescent light which is emitted towards side ends thereof, and a pair of sensors for detecting the intensity of the fluorescent light emitted from the side ends of the fluorescent fiber.

A scanning optical system according to the present invention may comprise an image forming optical system for emitting a scanning beam modulated in accordance with an image information onto a destination surface, and a reading optical system for receiving light emitted from an object surface to obtain an image information of the object surface, wherein the reading optical system is capable of executing a reading operation independently of an image forming operation of the image forming optical system, and at least one optical element is used either in both the image forming optical system or in the reading optical system. The at least one optical system may include a deflection mirror for deflecting a beam to execute scanning. The image forming optical system may include a collimator for emitting a laser beam modulated by the image information, and wherein the reading optical system may include another collimator for emitting another laser beam for illuminating the object surface.

The deflection mirror may include a plurality of reflection surfaces, wherein the laser beam and the another laser beam are deflected on different surfaces of the plurality of surfaces of the deflection mirror.

The image forming optical system may further comprise a curved mirror for reflecting the beam deflected by the deflection mirror towards the destination surface, wherein the curved mirror has a power in a direction along which the scanning beam scans. The beam reflected by the curved mirror may have a predetermined angle with respect to a beam incident thereto in the direction perpendicular to the direction in which the scanning beam scans.

The image forming optical system may comprise an fθ lens.

The reading optical system may include a curved mirror for reflecting the beam deflected by the deflection mirror towards the destination surface, wherein the curved mirror has power in a direction along which the another laser beam is deflected and scans. The beam reflected by the curved mirror may have a predetermined angle with respect to a beam incident thereto, in the direction perpendicular to the direction in which the scanning beam scans.

The reading optical system may comprise an fθ lens.

The scanning optical system may comprise an optical element wherein a beam of light passes through the element without being reflected therein. A component of a beam which is outputted from the optical element after having been reflected inside the optical element proceeds along a different optical path from the path of the non-reflected beam. In order to ensure the foregoing, an optical axis of the optical element may be displaced with respect to an optical axis of the beam passing through the optical element.

Still further, a scanning optical system, according to the present invention, may comprise an image forming optical system for emitting a scanning beam modulated in accordance with an image information onto a destination surface, and a reading optical system for illuminating an object surface with light having a plurality of wavelengths and for receiving reflected light from the object surface to obtain an image information of the object surface, wherein a predetermined optical path and at least one optical element is used either in the image forming optical system or in the reading optical system.

Further yet, a scanning optical system, according to the present invention, may comprise an image forming optical system for emitting a scanning beam modulated in accordance with an image information onto a destination surface, a reading optical system for illuminating an object surface with light having a plurality of wavelengths and for receiving reflected light from the object surface to obtain an image information of the object surface, and means for switching an optical path depending on whether the image forming optical system is used or the reading optical system in used, wherein a predetermined optical path and at least one optical element is commonly used either in the image forming optical system or in the reading optical system.

Still further, a scanning optical system, according to the present invention, may comprise an image forming optical system for emitting a scanning beam modulated in accordance with an image information onto a destination surface, and a reading optical system for illuminating an object surface with light having a plurality of wavelengths and for receiving reflected light from the object surface to obtain an image information of the object surface, wherein at least one optical element is used either in the image forming optical system or in the reading optical system.

Further yet, a scanning optical system may comprise a light source for emitting a beam of light, deflection means for deflecting the beam of light to scan on an object surface, and dividing means for spatially dividing the beam of light emitted by the light source from a reflected beam which is reflected by the object surface. The scanning optical system may further include a light receiving element for receiving the reflected beam divided by the dividing means.

The dividing means may comprise a mirror member having a transparent portion for allowing the beam of light to pass through, and a reflection portion for reflecting the reflected beam.

Further, a scanning optical system, according to the present invention, may include a light source for emitting a beam of light, deflection means for deflecting the beam of light to scan on an object surface, light receiving means for receiving a reflected beam from the object surface, and lens means provided between the object surface and the light receiving means for converging the reflected beam, wherein an optical axis of a deflected beam incident to the object surface and an optical axis of the reflected beam form a predetermined angle in the direction perpendicular to the direction where the deflected beam scans on the object surface.

DESCRIPTION OF THE ACCOMPANYING DRAWINGS

FIGS. 7A–7C illustrate a bow due to the inclination of the polygonal mirror;

FIG. 16 shows a separation of the beam based on the polarization;

FIG. 17 shows the P-component of the beam passing through a beam splitter;

FIG. 21 is a graph showing the intensity of laser beam emitted by the optical system of FIG. 20 with respect to the P-component and S-component;

FIG. 22 is a time chart showing the intensity of S-component of the laser beam emitted by the optical system of FIG. 20;

FIG. 23 is a time chart showing the intensity of P-component of the laser beam emitted by the optical system of FIG. 20;

FIG. 34 shows the arrangement of the reading optical system of the third modification of the third embodiment in the main scanning plane;

FIG. 36 shows an arrangement of the reading optical system of the fourth modification of the third embodiment in the main scanning plane;

Figure 37A:
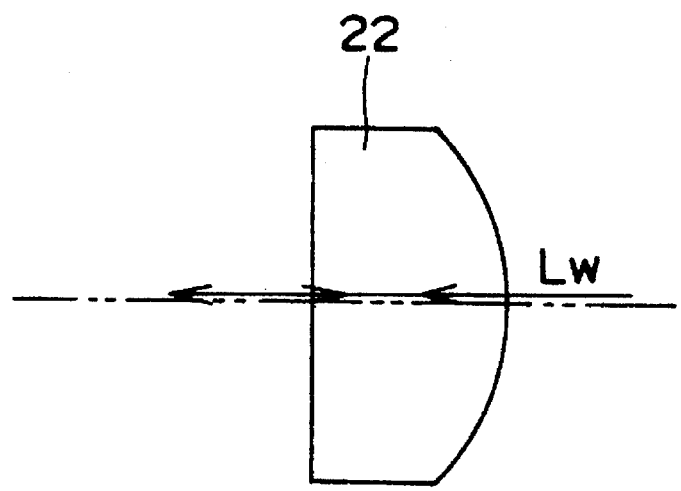
Figure 37B:
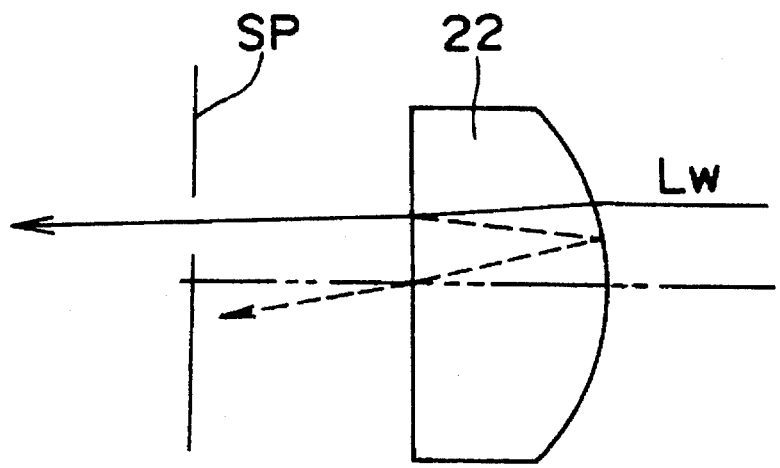
Figure 38:
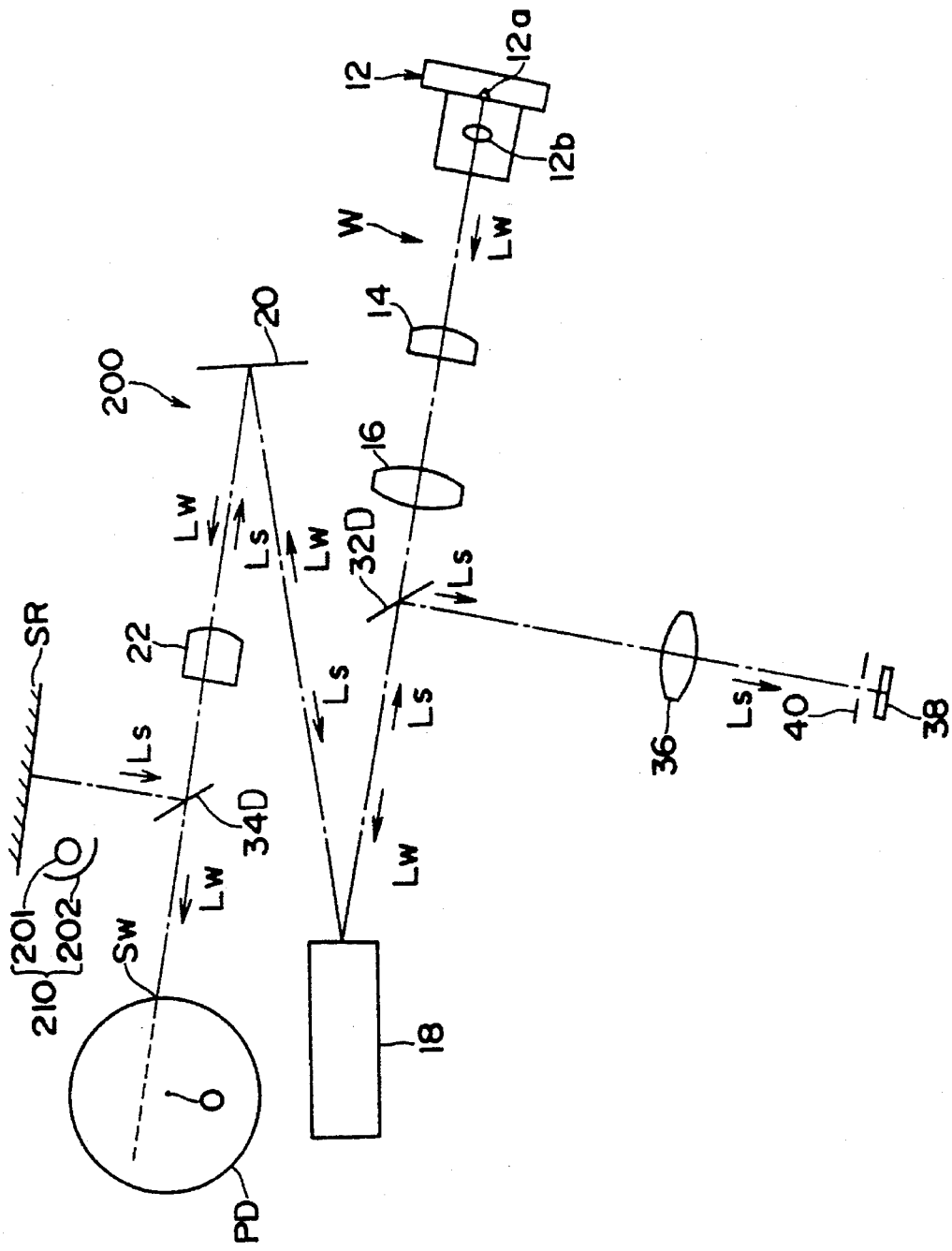

FIGS. 37A and 37B schematically show an arrangement of the toric lens and a light shield member; and FIG. 38 shows an arrangement of a fourth embodiment of the scanning optical system in the auxiliary scanning plane.

DESCRIPTION OF THE EMBODIMENTS

A first embodiment of a scanning optical system will be described with referring to FIGS. 1 through 13.

The scanning optical system 10 has a reading optical system R and an image forming optical system W. The reading optical system R and the image forming optical system W have a common optical path, and common optical elements. Further, in the scanning optical system 10, a reading operation, and an image forming operation can be executed simultaneously and independently.

Hereinafter, in the specification, the term main scanning direction is defined as the direction in which the laser beam deflected by the polygonal mirror scans, i.e., the direction of the rotational axis of the photoconductive drum. Further, the term auxiliary scanning direction is defined as the direction perpendicular to the main scanning direction, i.e., the direction where the photoconductive drum rotates.

Figure 1:
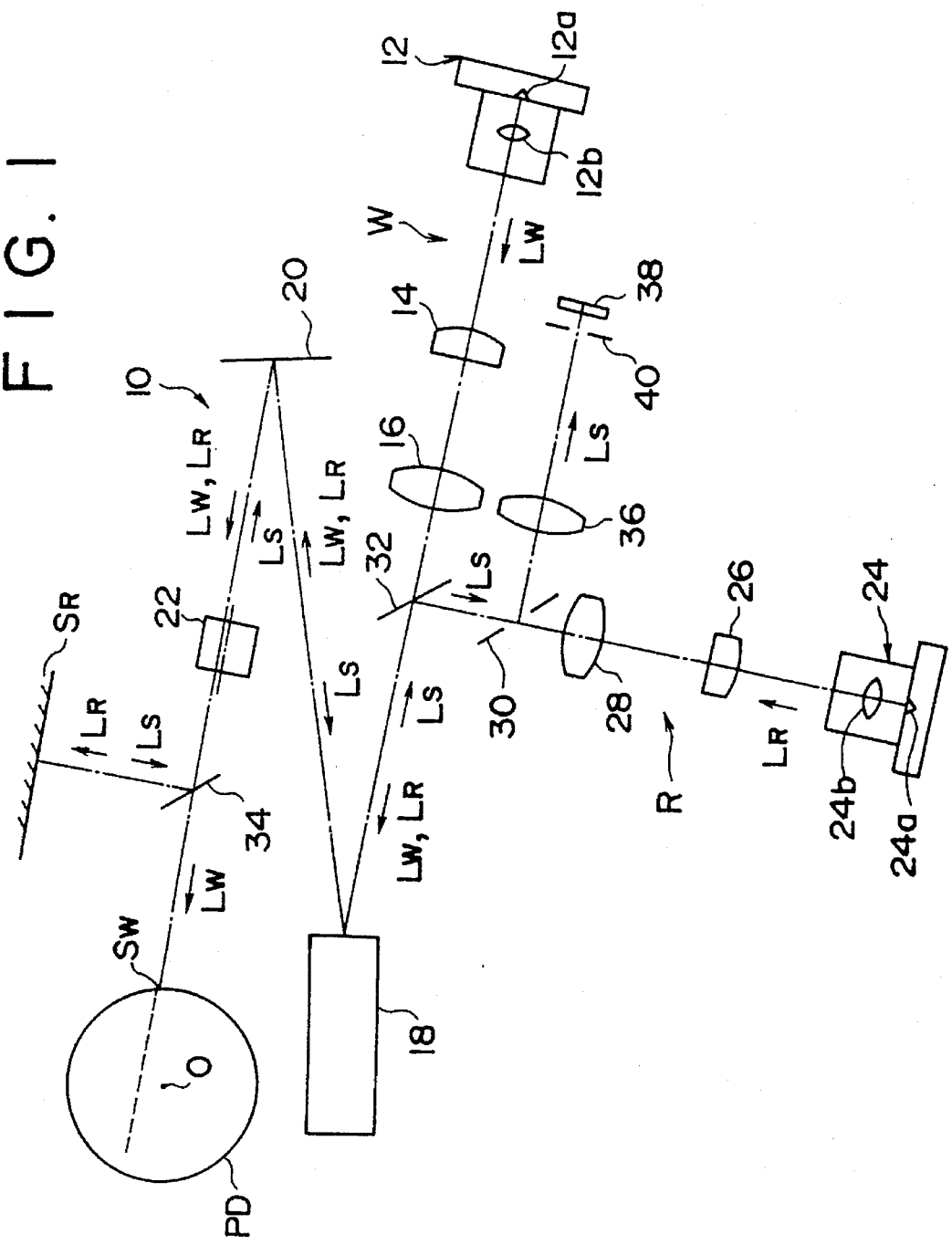
FIG. 1 is a schematic side view showing an arrangement of the optical system 10 in an auxiliary scanning direction.

FIG. 1 shows an arrangement of the scanning optical system 10 in an auxiliary scanning direction.

In the image forming optical system W, a laser beam Lw emitted by a light source (a collimator 12) passes through a cylindrical lens 14, and an objective lens 16. A second beam splitter 32 allows the laser beam Lw, which will be described later, and the laser beam Lw is deflected by a polygonal mirror 18 which functions as a deflection mirror. Then the laser beam Lw is reflected by a cylindrical mirror 20 which serves as a curved mirror. A third beam splitter 34 allows the laser beam Lw to pass through. The laser beam Lw passed through a toric lens 22 as an anamorphic lens is directed to the destination surface Sw.

In the reading optical system R, the laser beam LR is emitted by a collimator 24. The laser beam LR passes through a cylindrical lens 26, and an objective lens 28. Then, the laser beam LR passes through a first beam splitter 30 and is incident to the second beam splitter 32. The second beam splitter 32 allows the laser beam LR to reflect. Thus, the laser beam LR is directed to the polygonal mirror 18, then reflected by the cylindrical mirror 20 to enter the toric lens 22. The laser beam LR passed through the toric lens 22 is incident to the third beam splitter 34. Since the third beam splitter 34 reflects the laser beam LR, the laser beam LR is incident to the object surface SR. The beam reaching the object surface SR is scattered. The scattered light Ls returns the same path as the laser beam LR proceeds. By the first beam splitter 30, the laser beam is directed to an anamorphic lens 36, passes through, and is received by the light receiving element 38.

As described above, in the scanning optical system 10, the optical path between the first beam splitter 32 and the third beam splitter 34, and three optical elements: the polygonal mirror 18; the cylindrical mirror 20; and the toric lens 22, are commonly used in the reading optical system R and in the image forming optical system W.

The collimator 12 has a semiconductor laser 12a and a collimator lens 12b. The semiconductor laser 12a emits laser beam Lw having a first predetermined wave length $\lambda 1$ which is modulated in accordance with the image information. The collimator lens 12b causes the laser beam Lw passed therethrough to proceed as a parallel beam.

The cylindrical lens 14 has power only in the auxiliary scanning direction, and does not have power in the main scanning direction. The objective lens 16 has power both in the auxiliary scanning direction and the main scanning direction. A second beam splitter 32, allows the beam of light having the wavelength of $\lambda 1$ to pass through. Thus, the light passed through the cylindrical lens 14 is incident to the polygonal mirror 18 through the second beam splitter 32.

The polygonal mirror 18 deflects the laser beam Lw towards the cylindrical mirror 20 so as to scan in the main scanning direction.

The power of the cylindrical lens 14 and that of the objective lens 16 are set such that the laser beam Lw forms a line-spread image at the position closely adjacent to the reflection surface of the polygonal mirror 18 as they are combined. The line-spread image extends along the main scanning direction.

The power of the objective lens 16 is set such that the laser beam Lw emitted from the collimator 12 is focused behind the destination surface Sw if any other power is not applied.

Figure 3:
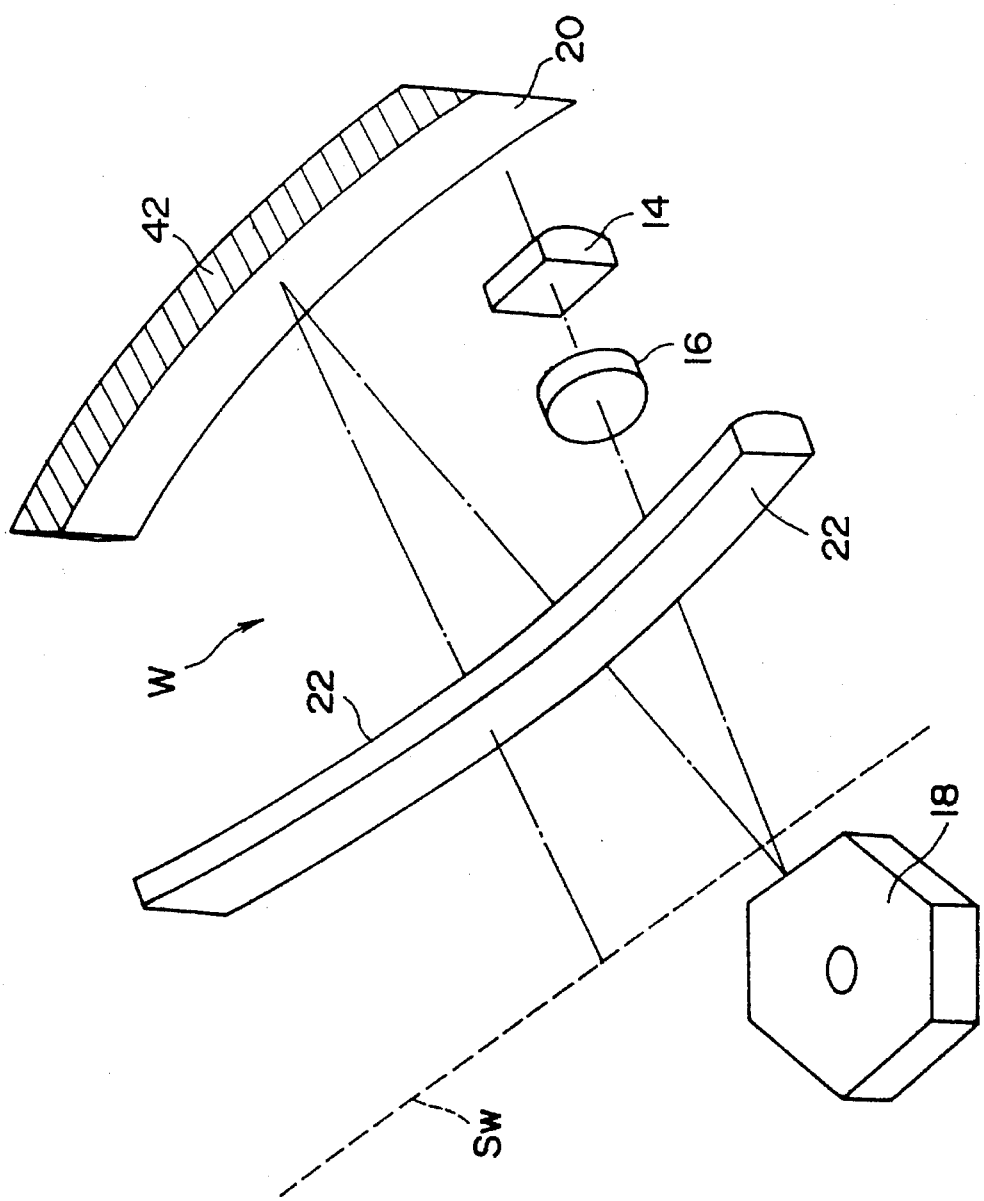
FIG. 3 is a perspective view of an image forming optical system included in the optical system 10.
Figure 4:
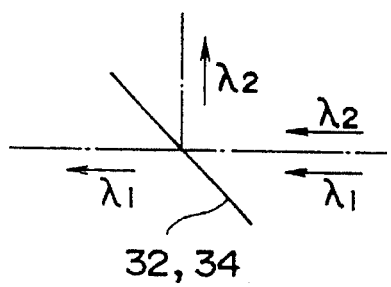
FIG. 4 is a diagram illustrating a reflection characteristic of a dichroic mirror.

The polygonal mirror 18 of the scanning optical system 10 is driven by a motor (not shown) to rotate about a rotation axis at relatively high speed. The polygonal mirror 18 is, as shown in FIG. 3, provided with six flat reflection surfaces. Each of the reflection surfaces is arranged to be located from the rotational axis of the polygonal mirror 18 by the same distance. The reflection planes of the six reflection surfaces are arranged parallel with the rotational axis of the polygonal mirror 18, and every two adjacent surfaces form angle an of 120 degrees.

The optical axis of the collimator 12 intersects the reflection surfaces of the polygonal mirrors at an angle which is inclined (i.e., having a predetermined angle) in the auxiliary scanning direction, and intersects the rotational axis of the polygonal mirror 18. Further, the optical axis of the laser beam Lw is incident to the polygonal mirror 18 from substantially the center of the scannable area (i.e., the area within which the deflected laser beam scans).

The cylindrical mirror 20 is formed such that the reflection surface is spherical along the main scanning direction, and flat in the auxiliary scanning direction. Thus, the cylindrical mirror 20 has power only in the main scanning direction.

Figure 2:
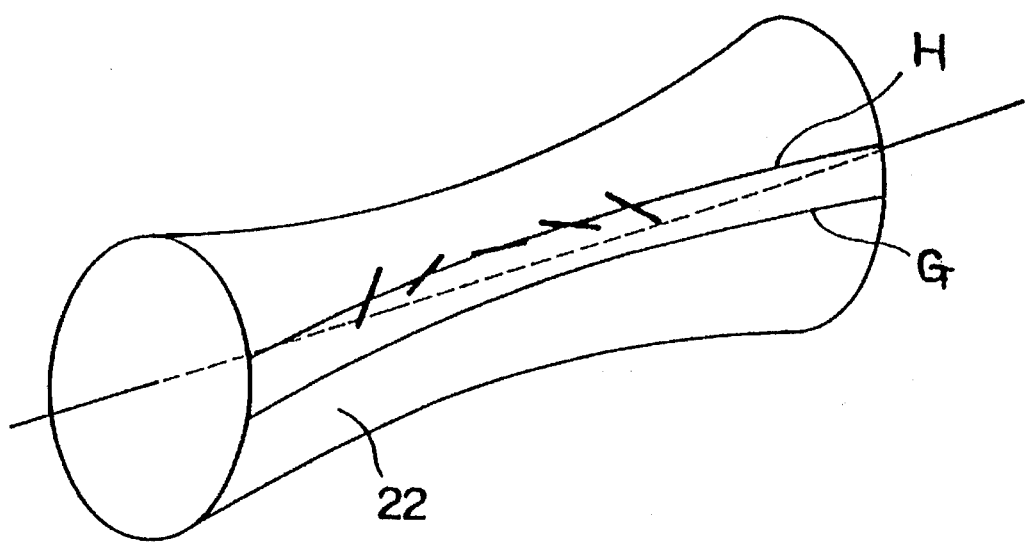
FIG. 2 is a perspective view of a modeled toric lens.

The toric lens 22 has a shape such that it is curved oppositely to the curvature of the cylindrical mirror 20 in the main scanning direction as shown in FIG. 2. The toric lens 22 has power in the auxiliary scanning direction, and does not have power in the main scanning direction. The power of the toric lens 22 at the central portion along the longitudinal portion is stronger than the power at the side portion thereof. Further, the toric lens 22 is arranged such that the optical axis thereof is shifted with respect to the optical axis of the scanning optical system 10 as shown in FIG. 1. A third beam splitter 34 is provided, which allows the beam of light having the wavelength of $\lambda 1$ to pass through. Accordingly, the laser beam Lw passed through the toric lens 22 is directed through the third beam splitter 34 to the destination surface Sw.

The cylindrical mirror 20 does not have power in the auxiliary scanning direction, and the laser beam incident to the cylindrical mirror 20 is inclined in the auxiliary scanning direction. Consequently, the beam reflected by the cylindrical mirror 20 is converged with the image surface being curved (i.e., curvature of the image surface occurs). In order to avoid this phenomenon, the power of the toric lens 22 is set such that the laser beam reflected by the polygonal mirror 18, and by the cylindrical mirror 20 forms an image within a predetermined focal depth (i.e., the curvature of the image surface is substantially canceled) on the destination surface Sw.

The power of the cylindrical mirror 20 in the main scanning direction is set such that the beam passed through the objective lens 16 is converged on the destination surface Sw.

The laser beam Lw passed through the toric lens 22 is converged on the destination surface, i.e., a surface on which an image is formed. In this embodiment, the destination surface Sw is a circumferential surface Sw of a photoconductive drum PD, where a photoconductive material is provided. As shown in FIG. 1, the optical axis of the laser beam Lw does not cross the rotation axis O of the photoconductive drum PD. Consequently, a beam reflected on the photoconductive drum PD does not return the path of the incident laser beam Lw. In the collimator 12, there is provided a detector which receives a laser beam emitted by the semiconductor laser 12a to detect the intensity of the emitted beam in order to regulate the intensity of the outputted laser beam Lw. If the laser beam reflected on the destination surface Sw comes back to the semiconductor laser 12a, the detector may detect the combined intensity erroneously. In order to avoid such a problem, in the scanning optical system 10, it is constructed that the laser beam reflected on the photoconductive surface Sw is not directed to the semiconductor laser 12a as described above. Accordingly, in the image forming optical system W, it is assured that the intensity of the laser beam Lw emitted by the semiconductor laser 12a is constant. Further, as shown in FIG. 1, the laser beam reflected on the photoconductive surface Sw is directed towards the direction opposite to the direction where a light receiving element 38 of the reading optical system R is located. In other words, the reflected beam is not directed to the light receiving element 38.

The second beam splitter 32 and the third beam splitter 34 are inclined by 45 degrees with respect to the optical axis of the scanning optical system 10. The second and third beam splitters 32, 34 are respectively made of dichroic mirror which allows the light having the wavelength of $\lambda 1$ to pass therethrough, and reflects the light having the wavelength of $\lambda 2$.

Figure 5:
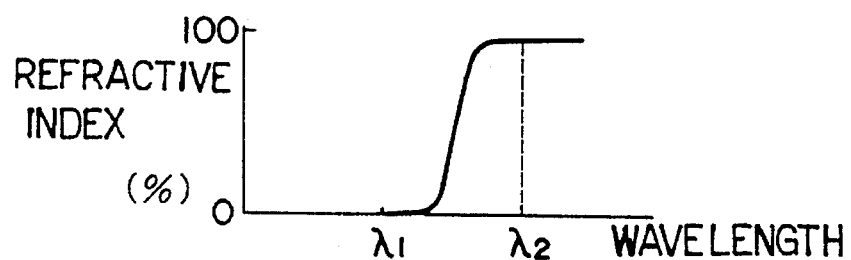
FIG. 5 is a graph showing the reflection characteristic of the dichroic mirror.

FIG. 5 shows the characteristic of the dichroic mirror. In the first embodiment, the first wavelength $\lambda 1$ is smaller than the second wavelength $\lambda 2$. The dichroic mirror reflects the light having the wavelength of $\lambda 2$ or more, and allows the light having the wavelength of $\lambda 2$ or less to pass through. As shown in FIG. 5, between $\lambda 1$ and $\lambda 2$, there is a transition range where the reflectance changes from 0 (zero) percent to 100 percent. Thus, the dichroic mirror selectively reflects or passes the beam in accordance with the wavelength of the incident beam. In other words, the beams are combined or separated in accordance of the wavelengths thereof.

As described above, the optical elements and the optical paths of the scanning optical system 10 are arranged to spread both in the main scanning direction and in the auxiliary scanning direction.

The collimator 24 functions as a light source for illuminating the object surface. The collimator 24 has a semiconductor laser 24a for emitting a non-modulated laser beam LR having a second predetermined wavelength. As described above, the laser beam LR passes through a collimator lens 24b and proceeds as a parallel beam.

The cylindrical lens 26 is a lens having power only in the auxiliary scanning direction, and the objective lens 28 has power both in the main scanning direction and in the auxiliary scanning direction. The cylindrical lens 26 and the objective lens 28 function substantially similar to the cylindrical lens 14 and objective lens 16 of the image forming optical system W.

The first beam splitter 30 spatially separates the scattered light Ls, which is reflected on the object surface SR, from the laser beam LR emitted by the collimator 24. The laser beam LR passed through the first beam splitter 30 is reflected by the second beam splitter 32 to proceed along the same optical path as the laser beam Lw proceeds, and is incident to the polygonal mirror 18. The optical axis of the collimator 24 intersects the optical axis of the laser beam Lw emitted by the collimator 12 at the point where the laser beam LR is reflected by the second beam splitter 32. Thus, the laser beam LR is combined with the laser beam Lw, or the laser beam LR proceeds along the same optical path as the laser beam Lw proceeds. Thus, the laser beam LR is directed to the third beam splitter 34 similarly to the laser beam Lw as described above.

Even if the laser beam LR is combined with the laser beam Lw, the third beam splitter 34 separates the laser beam LR from the laser beam Lw in accordance with the difference of the wavelengths.

The laser beam LR reflected by the third beam splitter 34 is reflected by the object surface SR to be scanned and scattered. Scattered light Ls is reflected by the third beam splitter 34, and proceeds along the same optical path as the incident beam LR proceeds to the second beam splitter 32 in the reverse direction.

Figure 6:
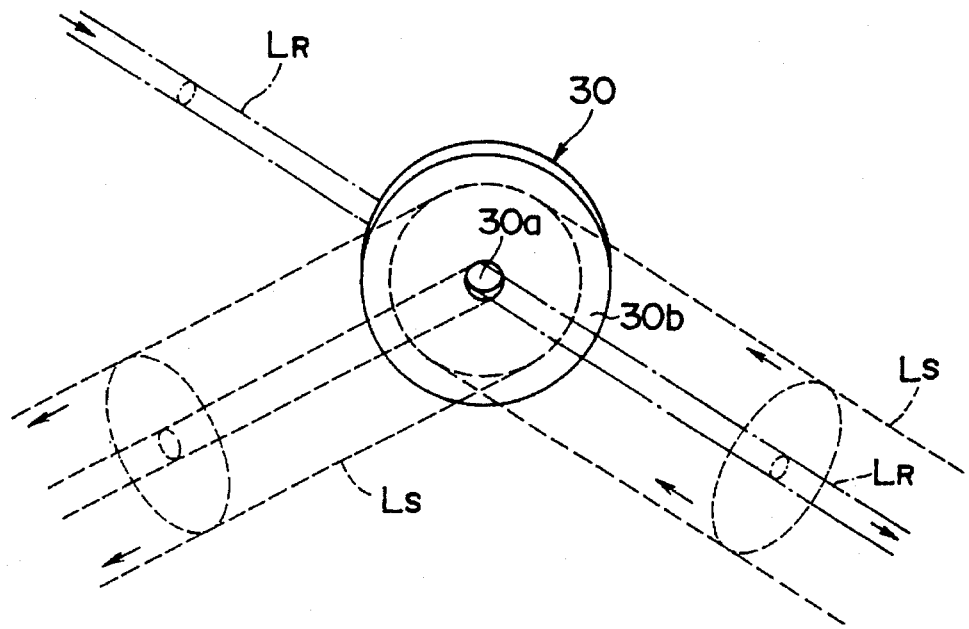
FIG. 6 is a perspective view of a mirror having an opening.

The second beam splitter 32 separates the scattered light Ls from the optical path which is common between the reading optical system R and the image forming optical system W. Further, the scattered light Ls is spatially separated from the optical path of the laser beam LR by the first beam splitter 30. As shown in FIG. 6, the first beam splitter 30 is a disc shaped mirror having a circular opening 30a at the central portion thereof. The first beam splitter 30 is arranged to incline by 45 degrees with respect to the optical axis of the laser beam LR emitted from the collimator 24. The laser beam LR passes through the opening 30a. For this purpose, the size of the opening 30a is determined so that the laser beam LR passes through without being eclipsed. The surface of the first beam splitter 30 facing the image forming optical system W is formed to be a mirror surface 30b for reflecting the scattered light Ls. The size of the mirror surface 30b determines the intensity of light directed to the light receiving element 38, and is designed with taking the sensitivity of the light receiving element 38 into account.

The scattered light Ls is separated from the optical path of the laser beam LR as reflected by the first beam splitter 30, and received by the light receiving element 38 through the anamorphic lens 36.

The light receiving element 38 outputs the detection signal to a image reading device (not shown) in accordance with the strength of the received signal. Since the position of the object surface SR can be identified from a synchronous signal or the like (not shown), and the intensity of the scattered light Ls varies in accordance with the brightness of the portion of the object surface SR, a two dimensional image information can be obtained.

In the scanning optical system 10, the anamorphic lens 36 has functions of a collimator lens, a cylindrical lens, and an objective lens. In this regard, it is possible to construct the reading optical system such that the cylindrical lens 26 and the objective lens 28 are replaced with this type of anamorphic lens.

In front of the light receiving element 38, at the conjugate position with respect to the object surface SR, a light shield plate 40 is provided. The light shield plate 40 has an opening for allowing the scattered light Ls to pass through, and prevents the incident beam other than the scattered light Ls or an ambient light from reaching the light receiving element 38. Further, as shown in FIG. 3, a light absorbing member 42 is provided on the top surface of the cylindrical mirror 20. The light absorbing member 42 prevents beams reflected by optical elements in the scanning optical system 10 from being incident to the light receiving element 38.

As described above, the ambient light or the irregular beam are prevented from being incident to the light receiving element 38. Consequently, noises such as ghosting and the like are avoided. Further, since the opening of the light shield plate 40 is located at the conjugate position with respect to the object surface SR, the position of the light receiving element 38 can be changed along the optical axis thereof within the range where the beam Ls substantially overlaps the light receiving area of the light receiving element 38.

As described above, the scanning optical system 10 is capable of performing a reading operation and an image forming operation at the same time, and independent of each other.

In the scanning optical system 10, the laser beam is incident to the polygonal mirror from the central position within the area where the reflected laser beam scans when seen from the auxiliary scanning direction (while being inclined in the auxiliary scanning direction). Further, the optical axis of the incident laser beam intersects the rotational axis of the polygonal mirror. Consequently, with respect to the same size of the polygonal mirror, the range where the laser beam can scan is broader in the scanning optical system 10 than in the conventional system. This is because, in the conventional systems, the incident beam and the reflected beam (the scanning beam) are on the same plane. With respect to the certain angle, the polygonal mirror can be made smaller in the scanning optical system 10 than in the conventional system. Furthermore, with the arrangement of the scanning optical system 10, the curvature of image surface occurs symmetrically with respect to the scanning area of the scanning optical system, compensation therefor can be facilitated.

Since the laser beams Lw and LR are incident to the polygonal mirror 18 with a predetermined angle in the auxiliary scanning direction, a skew of wavefront occurs as the polygonal mirror 18 rotates. That is, as the polygonal mirror 18 rotates, the direction where the line-spread image extends is changed. If the direction of the line-spread image differs from the direction of the power of the toric lens 22, the skew of wavefront occurs. The skew of wavefront worsens the wave front aberration of the laser beam, which deteriorate the convergence of the laser spot on the surface to be scanned. If the scanning area is relatively small, the skew of the wavefront can be ignored. However, since the skew of the wavefront is not negligible at the side areas when the scanning area is wide, it becomes necessary to cancel or compensate this wavefront aberration (i.e., the skew of wavefront). In the first embodiment, by locating the toric lens 22 such that the optical axis of the toric lens 22 is displaced in the auxiliary scanning direction with respect to the optical axis of the laser beam passing therethrough, the skew of wavefront is canceled.

FIG. 2 shows a modeled toric lens 22. As described above, the optical axis of the toric lens 22 is displaced with respect to the path of the laser beam. Accordingly, the locus "H" of the scanning beam on the surface of the toric lens 22 differs from the generatrix G of the toric lens 22. On the surface of the toric lens 22, the cross section of the laser beam is a predetermined oval shape. In FIG. 2, however, in order to stress the direction where the skew of wavefront affects, the beam is represented by thick lines which direction corresponds to the direction of the line-spread image lies near the polygonal mirror 18. As described above, since the laser beam scans on the toric lens 22 at the position different from the generatrix G of the lens 22, the skew of wavefront is compensated by the prismatic function thereof.

Further, by arranging the toric lens 22 as described above, a certain kind of noise can be reduced as described below.

FIGS. 37A and 37B show the toric lens 22 to which the laser beam Lw is incident. In FIG. 37A, the laser beam Lw is incident along the optical axis of the toric lens 22 as in a conventional arrangement. In this case, inside the toric lens 22, a part of the incident beam is reflected by the surface facing the destination surface Sw. The reflected beam may be reflected, inside the toric lens 22, by the other surface. Consequently, the incident beam is combined with the beam reflected inside the toric lens 22. This phenomenon occurs because the optical axis of the toric lens 22 coincides with the optical axis of the incident beam. Such a phenomenon causes the noise of the scanning beam, and may deteriorate the quality of the formed image.

In FIG. 37B, which shows the arrangement in the scanning optical system 10, even if a part of the incident beam is reflected by the lens surfaces, the reflected beam proceeds in the different path as shown in broken lines. In other words, the original beam directly passing through the toric lens 22 and the noise (i.e., the reflected beam indicated by the broken lines) are spatially separated. Accordingly, by providing a light shield plate having a slit which allows only the laser beam Lw to pass through and prevents the noise component from passing through, the noise can be omitted.

In the above description, the noise reduction in the image forming optical system is explained. The same arrangement can be employed in the reading optical system to prevent the laser beam LR from being combined with the noise before reaching the object surface SR.

In the optical system constructed as above, two bows (i.e., a bend of the scanned line in the auxiliary scanning direction) occur, which will be described below. One of the bows occurs because the beam incident to the polygonal mirror 18 is inclined with respect to the rotational axis of the polygonal mirror; and the other occurs because the beam incident to the cylindrical mirror 20 is inclined in the auxiliary scanning direction.

The former "bow" occurs as follows. FIGS. 7A through 7C show the changes of the deflecting point due to the rotation of the polygonal mirror 18. FIG. 7A shows the deflecting points on the main scanning plane, and FIG. 7B shows the deflecting points on the auxiliary scanning plane. When a beam and the reflecting surface of the polygonal mirror 18 form right angles, the beam is reflected at point 18a. If the polygonal mirror 18 rotates by a predetermined amount, the deflection point shifts to point 18b.

Since the axis of the incident beam is inclined in the auxiliary scanning direction, if the deflection point is shifted as shown in FIG. 7A due to the rotation of the polygonal mirror 18, the deflection point is shifted also in the auxiliary scanning direction as shown in FIG. 7B. Therefore, on the light reflecting surface of the polygonal mirror 18, the locus of the deflection point is bent as shown in FIG. 7C.

Even if the shift of the deflection point on the polygonal mirror 18 is ignored, since the incident beam is inclined in the direction of the auxiliary scanning, the locus of the reflected beam forms a cone.

Since the displacement of the beam, which is caused by the shift of the deflection point and the change of the reflected direction, is amplified and/or reduced by the optical system, it is unavoidable that the bow occurs on the destination surface Sw.

Figure 8A:
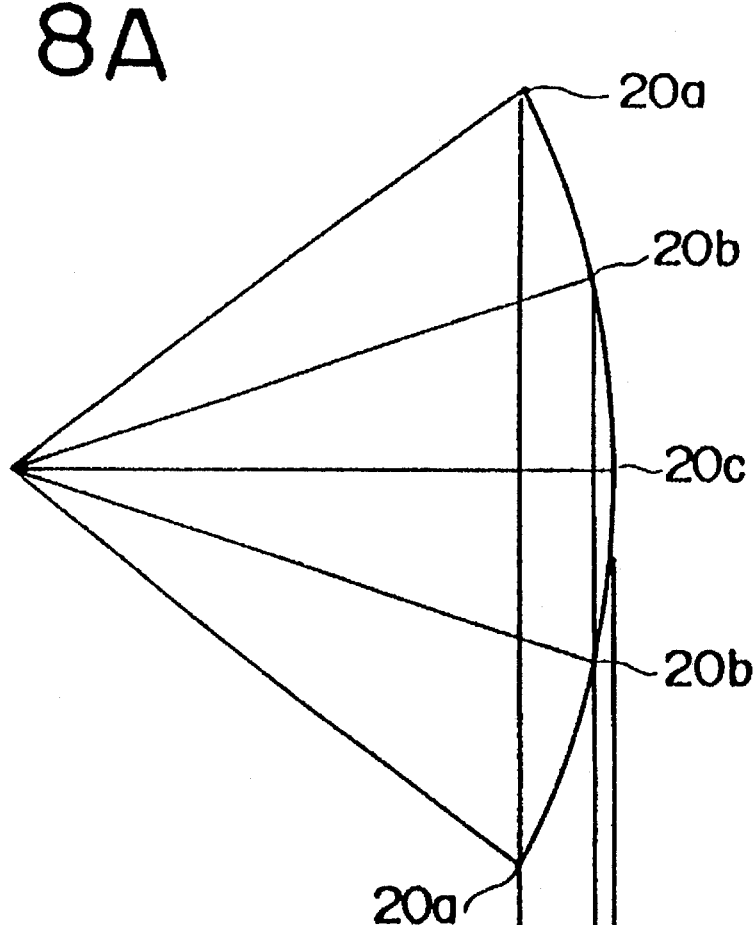
FIGS. 8A and 8B illustrate a bow due to the inclination of the cylindrical mirror.
Figure 8B:
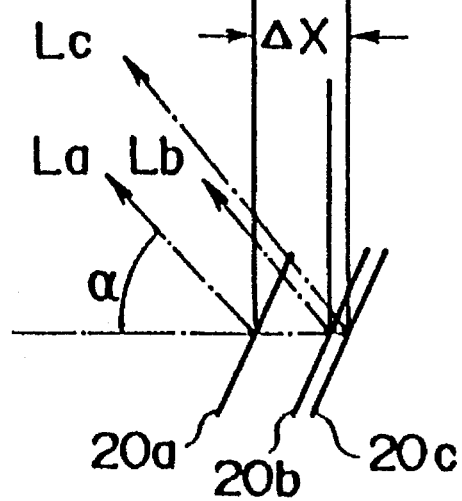
Figure 9:
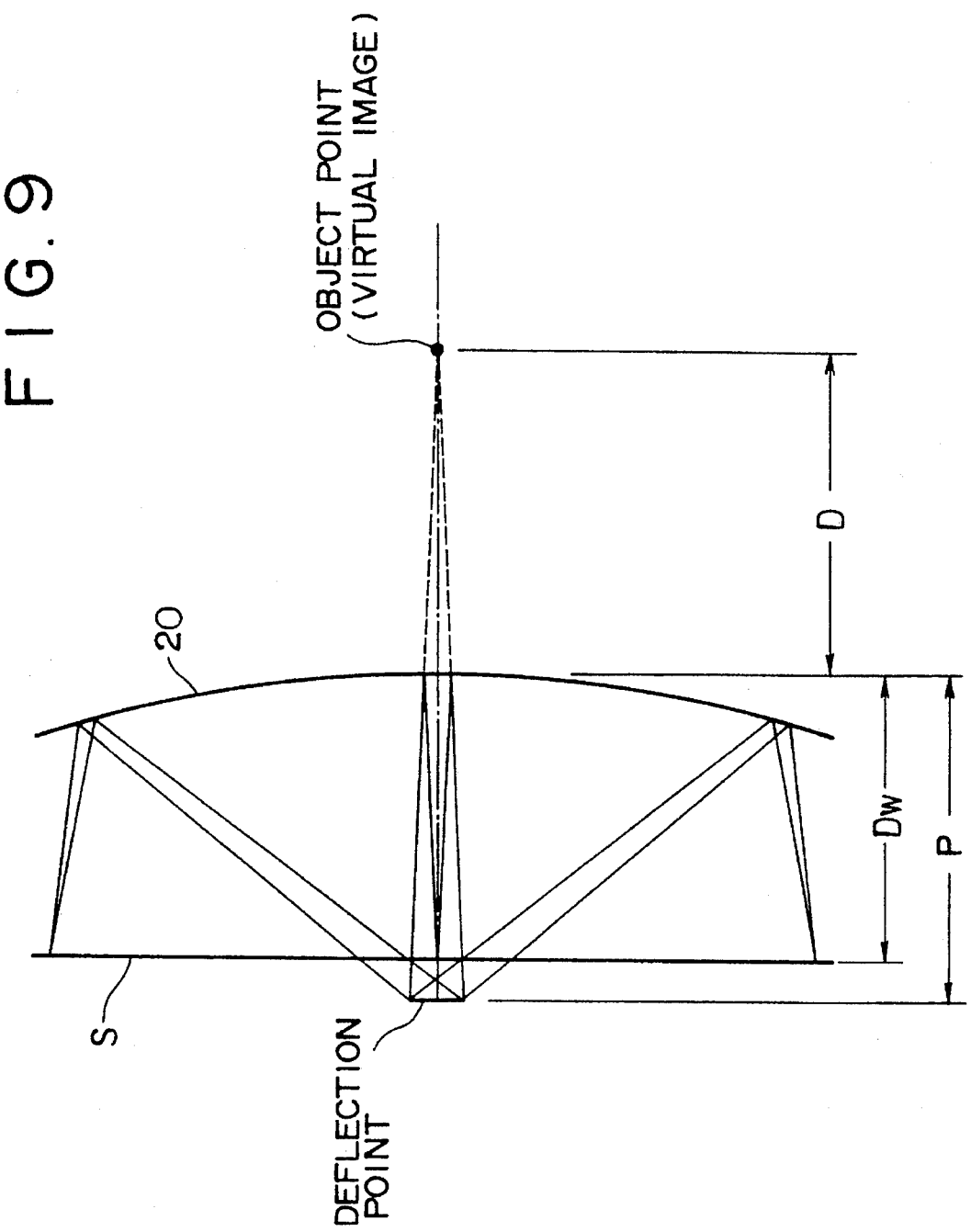
FIG. 9 is a diagram showing an fθ characteristic and a curvature of image surface.
Figure 10:
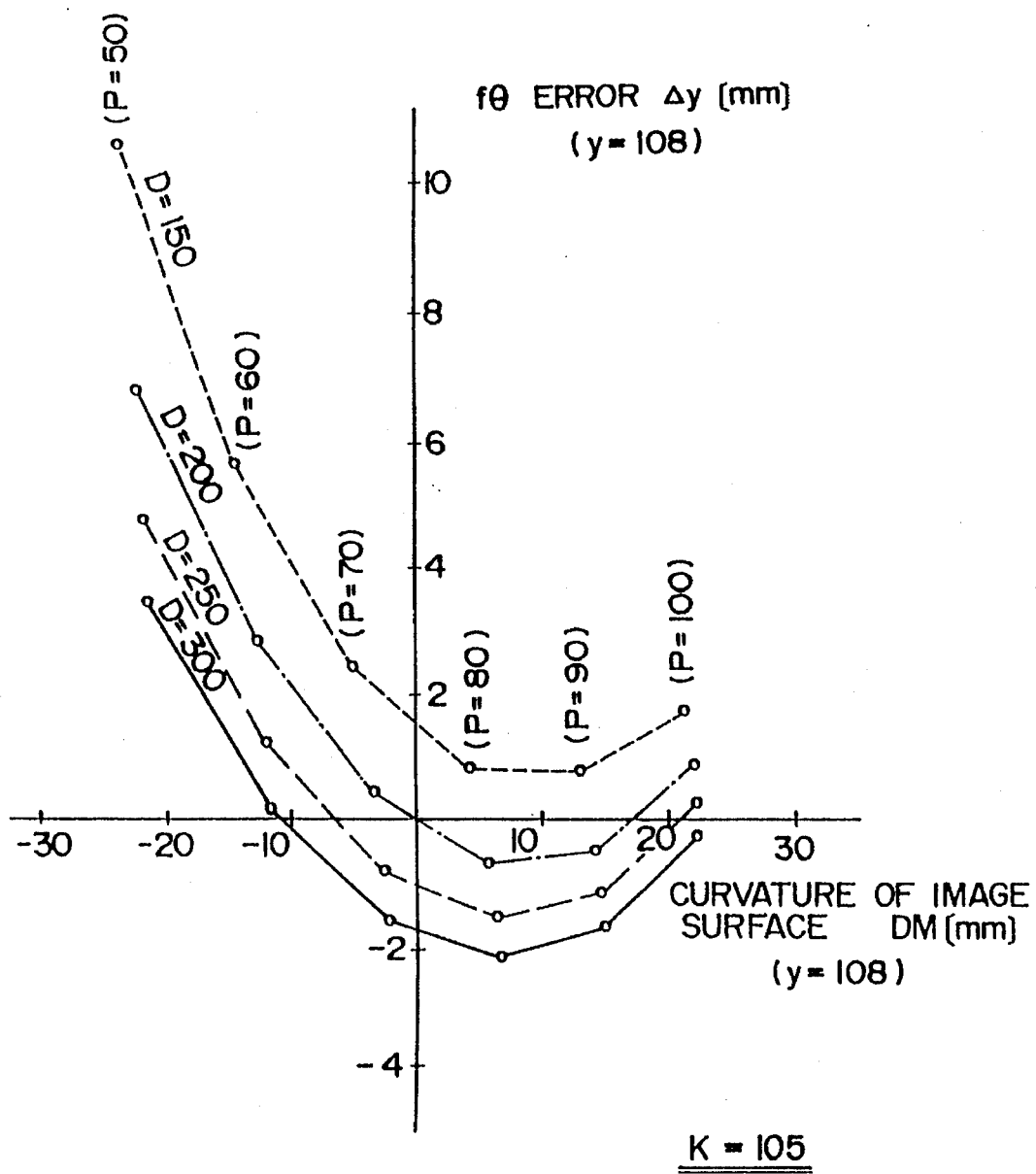
FIG. 10 is a graph showing a relation between fθ characteristic and the curvature of the image surface with respect to the distances D and P, when the scanning coefficient K=105.
Figure 11:
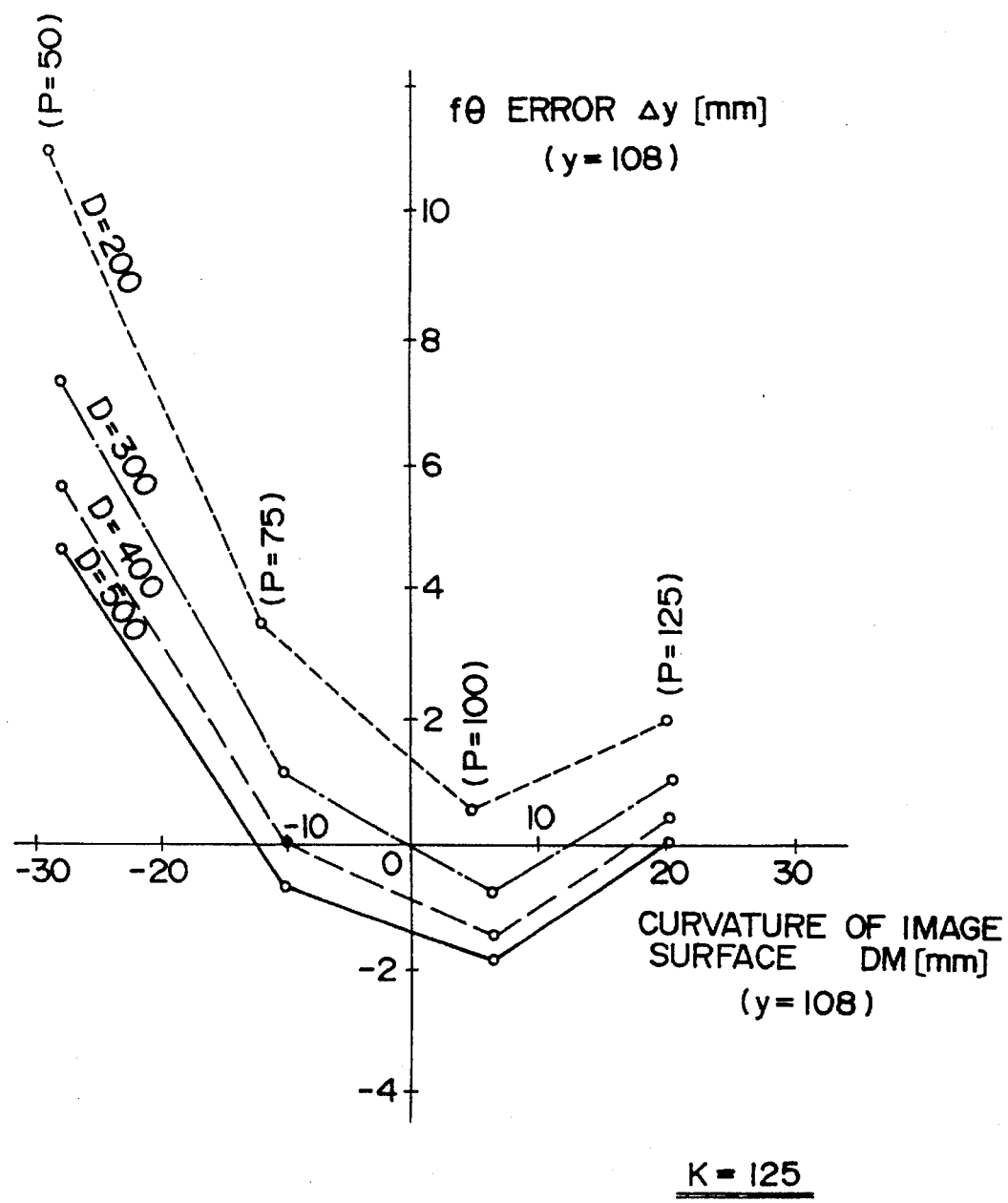
FIG. 11 is a graph showing a relation between fθ characteristic and the curvature of the image surface with respect to the distances D and P, when the scanning coefficient K=125.
Figure 12:
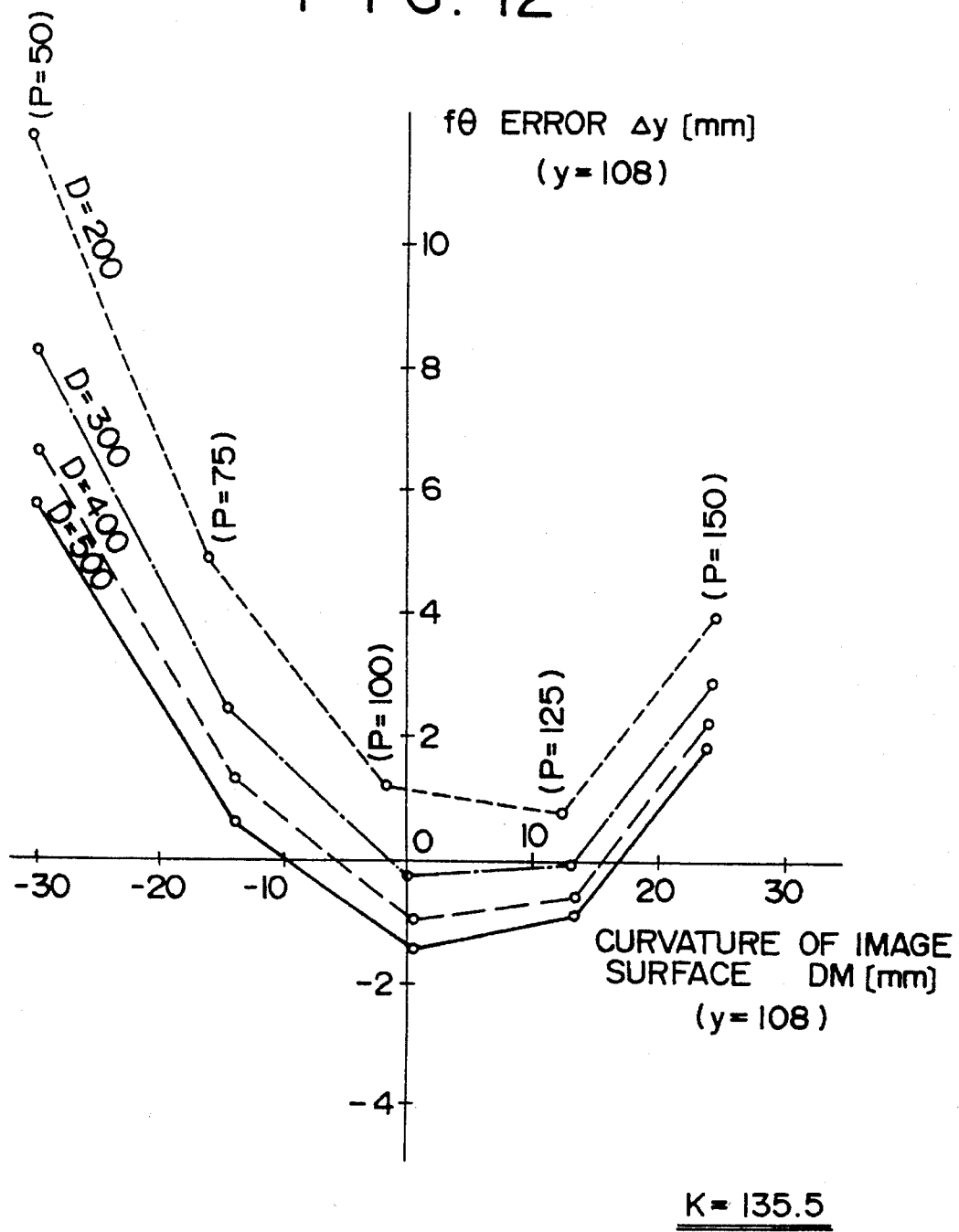
FIG. 12 is a graph showing a relation between fθ characteristic and the curvature of the image surface with respect to the distances D and P, when the scanning coefficient K=135.5.
Figure 13:
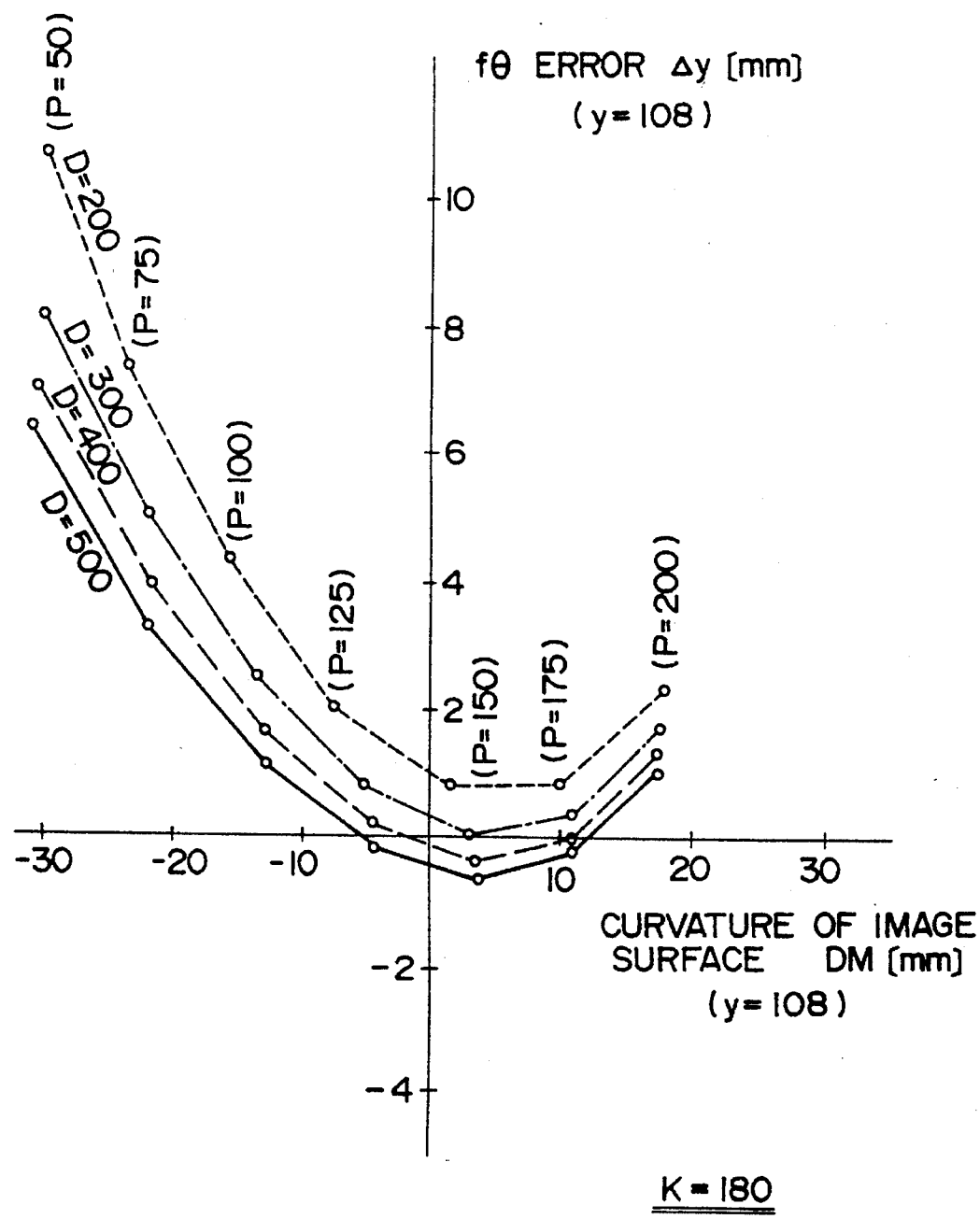
FIG. 13 is a graph showing a relation between fθ characteristic and the curvature of the image surface with respect to the distances D and P, when the scanning coefficient K=180.
Figure 14:
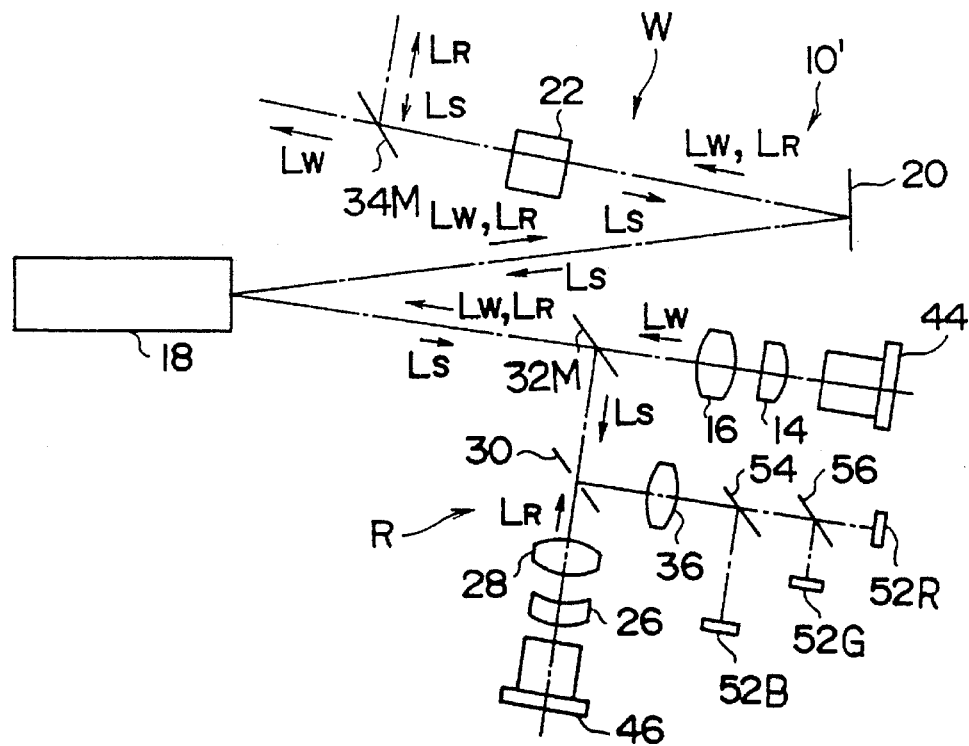
FIG. 14 shows an arrangement of the first modification of the first embodiment of the scanning optical system in the auxiliary scanning plane.

FIGS. 8A and 8B illustrate the occurrence of a bow due to the inclined incident beam with respect to the cylindrical mirror 20. FIG. 8A shows the reflection on the main scanning direction, and FIG. 8B shows the reflection in the auxiliary scanning direction. In a scanning area on the cylindrical mirror 20, the distance, in the direction of the optical axis of the mirror 20, between a reflecting point 20a at each side portion and a reflecting point, 20c at an each intermediate point is ΔX at the greatest. The laser beam incident to the cylindrical mirror 20 is inclined in the auxiliary scanning direction as shown in FIG. 8B. Accordingly, if the laser beam is always incident from the same direction, each of the reflected beams La, Lb and Lc reflected at the points 20a, 20b and 20c forms an angle α with respect to the respective incident beam. However, the reflected beams La, Lb and Lc are shifted in parallel with each other as shown in FIG. 8B, and accordingly, the bow occurs on the destination surface Sw.

Either the laser beam incident to the polygonal mirror 18 or the laser beam incident to the cylindrical mirror 20 is inclined in the direction of the auxiliary scanning. In the scanning optical system 10 embodying the present invention, the polygonal mirror 18 and the cylindrical mirror 20 are arranged so that the bows occurred thereby are in opposite directions, and the bow occurred by the polygonal mirror 18 is canceled by the bow occurred by the cylindrical mirror 20.

In the above described embodiment, in order to cancel the bow occurred by the cylindrical mirror 20, the laser beam incident to the polygonal mirror 18 is inclined (not perpendicular) with respect to the rotational axis of the polygonal mirror 18 so that the bow is formed in the opposite direction. In this case, the surface of the polygonal mirror 18 is formed in parallel with the rotational axis. Instead of this construction of the embodiment, it is possible to use a tapered polygonal mirror having plane surfaces each inclined with respect to the rotational axis thereof.

Since the laser beam scans the destination surface Sw by way of the cylindrical mirror 20, the curvature of the image surface and an fθ error is determined based on a radius r of the curvature of the cylindrical mirror 20, a distance Dw between the cylindrical mirror 20 and the destination surface Sw, and the scanning coefficient K.

In a system using an fθ lens, the image height Y is defined as:

Y=f * θ, wherein f is a focal length of the fθ lens, and θ is a deflection angle of the beam.

In the embodiments, the curved mirror is used instead of the fθ lens, and in order to define the relation of the image height Y and the deflection angle θ of the beam deflected by the polygonal mirror 18, the scanning coefficient K is used as a virtual focal length. With this respect, the image height Y is defined as:

Y=K * θ.

The radius of curvature r of the cylindrical mirror 20, and the distance Dw are obtained as follows.

$$f=(D+P) * Dw/D \tag{1}$$

$$1/Dw=(1/D)+(2/r) \tag{2}$$

wherein D is a distance along the optical axis between an object point and the cylindrical mirror 20, P is a distance between the cylindrical mirror 20 and the deflection point, and f is the focal length of the optical system in the main scanning plane.

From equation (1), $$Dw=f * D / (D+P) \tag{3}$$

From equations (2) and (3), $$r=2f * D /(D+P-f) \tag{4}$$

FIGS. 10 through 13 are graphs showing the relation between the fθ error Δy and the curvature of the image surface DM at the image height of 108 mm with respect to various combinations of distances D and P, and various scanning coefficients K (K=105, K=125, K=135.5, and K=180). From FIGS. 10 through 13, it is known that there exists a combination of the distances D and P which minimizes the fθ error Δy and the curvature of the image surface DM for the respective scanning coefficient.

In the first embodiment, i.e., in the scanning optical system 10, the laser beam LR and the laser beam Lw are combined or separated from each other. For this purpose, as described above, three beam splitters are employed. The second beam splitter 32 and the third beam splitter 34 are dichroic mirrors which selectively reflect or pass a beam in accordance with the wavelength thereof. The first beam splitter is the mirror member 30 having the opening 30a and the reflection surface 30b. Since the dichroic mirror selectively reflects or passes the beam of light, the intensity of the beam is not reduced by the second or third beam splitter. The opening 30a of the first beam splitter 30 does not eclipse the laser beam LR as it passes therethrough. Further, since the area of the opening 30a is much smaller than the area of the reflecting surface 30b, the intensity of the scattered light Ls which is reduced due to the opening 30a is small enough and negligible. As described above, in the first embodiment, the intensity of the beams travelling inside the scanning optical system 10 is not reduced substantially, and the scanning optical system 10 effectively removes noises. Further, with this construction, the scattered light Ls is not combined with the laser beam LR, and only the scattered light Ls is incident to the light receiving element 38.

In the first embodiment, between the polygonal mirror 18 and the object surface SR, the cylindrical mirror 20 is provided. When a beam of light is incident to a lens, the beam may be repeatedly reflected inside the lens by the surfaces thereof. In the first embodiment, however, the mirror is used instead of the lens. Thus, the noise due to the reflection inside the lens can be avoided.

Furthermore, the beam is incident to the polygonal mirror 18, and to the cylindrical mirror while being inclined in the auxiliary scanning direction, and the optical axis of the toric lens 22 is displaced with respect to the optical axis of the beam. Thus, the beam of light reflected by the surface of, for example, the toric lens 22 does not proceed along the optical axis of the laser beam LR or the scattered light Ls. Accordingly, the light receiving element receives only the scattered light Ls, and any noise component does not reach the light receiving element 38.

In the first embodiment, the first beam splitter 30 is not made of a dichroic mirror. This is because the laser beam LR and the scattered light Ls have the same wavelength. Conventionally, in order to split such beams, a half mirror is used. Since the extent of the laser beam LR is narrower than the scattered light Ls, these beams are spatially separated.

In the above description, a semiconductor laser and a collimator lens are used as a light source. It is possible to use a gas laser such as He-Ne laser, or Ar laser which emits substantially parallel beam, and if necessary, a modulator can be coupled thereto.

FIGS. 14 through 19 illustrate a scanning optical system 10' as a first modification of the first embodiment (referred to as 1-1 modification hereinafter).

In the 1-1 modification, the reading optical system R and the image forming optical system W have a common optical path. Similar to the first embodiment, a reading operation and an image forming operation can be executed simultaneously and independently. In the 1-1 modification, as described below, color images can be read and formed.

In the following description of the 1-1 modification, elemental structures identical to those in the first embodiment are denoted with the same reference numbers, and the descriptions thereof will be omitted.

In the 1-1 modification of the scanning optical system 10', a collimator 44 is used as a light source of the image forming optical system, and a collimator 46 is used as a light source of the reading optical system.

Figure 15:
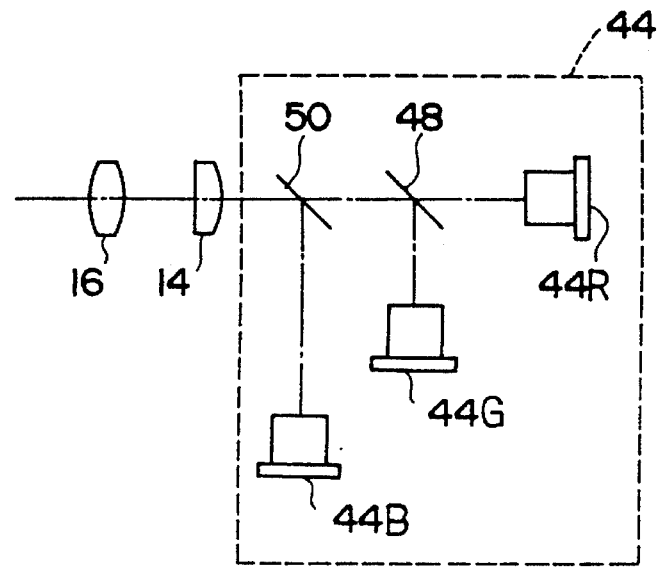
FIG. 15 shows a collimator of the first modification of the first embodiment.

The collimator 44 includes, as shown in FIG. 15, a red collimator 44R, a green collimator 44G, and a blue collimator 44B. The red collimator 44R outputs P-component of polarized red laser beam which is modulated in accordance with the image information; the green collimator 44G outputs a P-component of polarized green laser beam modulated in accordance with the image information; and the blue collimator 44B outputs a P-component of polarized blue laser beam modulated in accordance with the image information. As shown in FIG. 15, the cylindrical lens 14 and the objective lens 16 are arranged on the optical axis of the red collimator 44R. On the optical path between the red collimator 44R and the cylindrical lens 14, the fourth and fifth beam splitters 48 and 50 are inserted, each inclines with respect to the optical axis of the red collimator 44R by 45 degrees.

The fourth beam splitter 48 includes a dichroic mirror which allows red beam to pass through, and reflects green beam. The fifth beam splitter 50 includes a dichroic mirror which allows red and green beams to pass through, and reflects blue beam. The green collimator 44G outputs the green laser beam to the fourth beam splitter 48, the optical axis of the green collimator 44G crossing the optical axis of the red collimator 44R at right angles. The blue collimator 44B outputs the blue laser beam to the fifth beam splitter 50, the optical axis of the blue collimator 44B crossing the optical axis of the red collimator 44R at right angles.

As constructed above, the green modified laser beam is combined with the red modified laser beam at the fourth beam splitter 48, then the blue modified laser beam is combined therewith at the fifth beam splitter 50. Consequently, P-component of a laser beam is emitted from the collimator 44.

The collimator 46, as a light source of the reading optical system, has substantially the same construction as that of the collimator 44. Although not shown, the collimator 46 has red, green and blue collimator for outputting S-components of red, green and blue laser beams. Accordingly, the collimator 46 outputs the S-component of a laser beam.

In the 1-1 modification, each of the second and the third beam splitters 32M and 34M has a transparent glass plate, a beam selective layer being provided thereon. The beam selective layer has a characteristic such that the layer allows the P-component of light to pass therethrough, and reflects the S-component of light. Accordingly, if a beam including the P-component of light and the S-component of the light is incident to the second or the third beam splitter 32M or 34M, the beam is separated to the P-component and the S-component.

Figure 18:
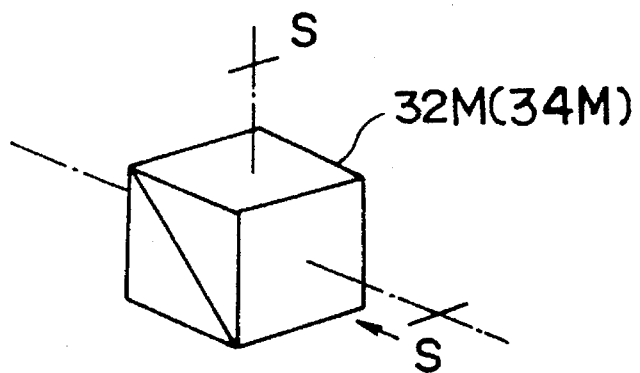
FIG. 18 shows the S-component of the beam reflected by the beam splitter.
Figure 19:
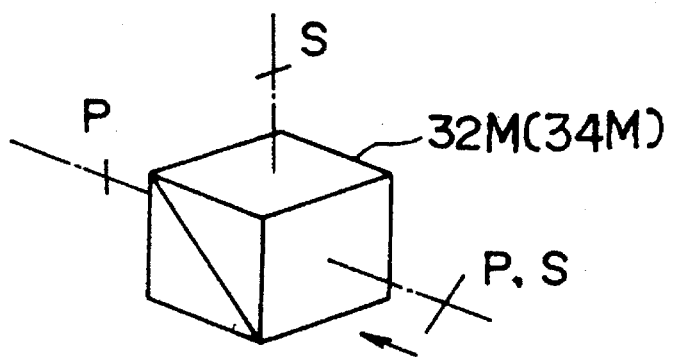
FIG. 19 shows the state where the P-component and S-component are separated by the beam splitter.

FIGS. 16 through 19 show modifications of the second and third beam splitters 32M and 34M. Each of the modified second and third beam splitters 32M and 34M has a pair of triangular prisms, which are adhered to each other with the beam selective layer being sandwiched therebetween. The plane of the beam selective layer is arranged to incline by 45 degrees with respect to the optical axis of the scanning optical system 10'. FIG. 17 shows when the P-component of beam is incident to the second or third beam splitter 32M or 34M. FIG. 18 shows when the S-component of beam is incident to the second or third beam splitter 32M or 34M. If a beam including both P-component and S-component is incident to the second or third beam splitter 32M or 34M constructed as above, each component is separated thereby, and proceeds along a different optical path from that of the other.

The reading optical system R is provided with a red light receiving element 52R, green light receiving element 52G, and blue light receiving element 52B, respectively for receiving red, green and blue laser beams. The red light receiving element 52R is located at the position where the red laser beam is focused by the anamorphic lens 36. On the optical path between the red light receiving element 52R and the anamorphic lens 36, a sixth beam splitter 54 and a seventh beam splitter 56 are inserted, each of which is inclined by 45 degrees with respect to the optical path.

The sixth beam splitter 54 is a dichroic mirror which allows the red and green beam to pass therethrough, and reflects the blue beam. The seventh beam splitter 56 is a dichroic mirror which allows the red beam to pass therethrough, and reflects the green beam. Thus, if a beam including red, green and blue light is directed from the anamorphic lens 36, firstly, the blue beam is reflected by the sixth beam splitter 54 and is directed to the blue light receiving element 52B. The beam which passes through the sixth beam splitter (i.e., the beam including red and green light) is then incident to the seventh beam splitter 56, and the green beam is reflected thereby. The green beam is therefore directed to the green light receiving element 52G. The beam which passes through the seventh beam splitter 56 includes only the red light, and is received by the red light receiving element 52R.

In the 1-1 modification of the scanning optical system 10', the laser beam Lw includes a plurality of beams having different wavelengths. Further, the laser beam Lw is polarized to have only P-component. Accordingly, the beam splitters are constructed so that the beams proceed along different optical paths in accordance with the polarity of the component which makes up the incident beam. With respect to the optical path, the path in the 1-1 modification is similar to that in the first modification, which is described above. The laser beam Lw includes red, green, and blue laser beams, each of which is modified in accordance with the image information. Accordingly, in the 1-1 modification, the destination surface Sw is provided with a photoconductive material which has sensitivity to respective colors. In other words, the destination surface Sw is constructed so that a color image can be formed when a beam Lw including color information is incident thereonto.

With respect to the reading operation of the 1-1 modification, since the laser beam LR having a plurality of wavelengths is incident to the object surface SR, the reflected scattered light Ls carries color image information. As described above, the scattered light Ls is divided into the red, green and blue beams by means of the sixth and seven beam splitters 54 and 56, and received respectively by the red, green and blue light receiving elements 52R, 52G and 52B, the color image on the surface SR can be read.

According to the 1-1 modification described above, the reading optical system R and the image forming optical system W have a common optical path, and common optical elements. Accordingly, the entire scanning optical system can be made compact. Further, according to the 1-1 modification, independent reading and image forming operations can be executed at the same time. Furthermore, in the 1-1 modification, color images can be read or formed. Since the scanning optical system 10$^r$ basically consists of mirrors, color images can be processed, with less chromatic aberration.

FIGS. 20 through 23 illustrate the second modification of the first embodiment (1-2 modification) of the scanning optical system 10D.

In the 1-2 modification, the reading optical system R and the image forming optical system W have a common optical path, and independent reading and image forming operations can be performed simultaneously. In the 1-2 modification, the beam splitters allow the incident beam to pass through or reflect the beam in accordance with the polarizing direction of the beam. Further, the reading optical system R and the image forming optical system W have the same common light source.

Figure 20:
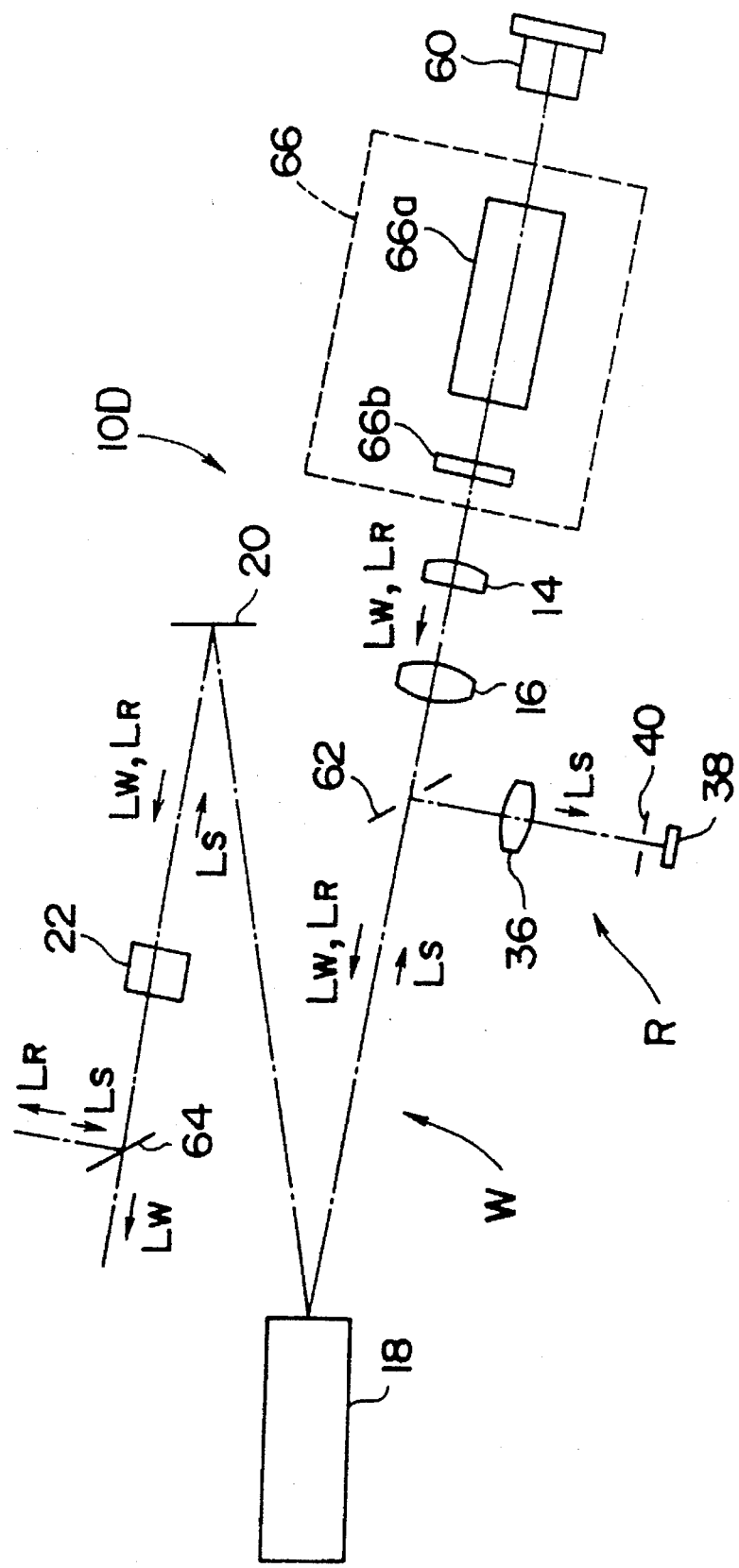
FIG. 20 shows an arrangement of the second modification of the first embodiment of the scanning optical system in the auxiliary scanning plane.

As shown in FIG. 20, the 1-2 modification has a single collimator 60 which is used as a light source for both the reading optical system and the image forming optical system. In the 1-2 modification, a beam splitter 62 is provided at the position corresponding to the second beam splitter 32 of the first embodiment. Corresponding to the third beam splitter 34 of the first embodiment, another beam splitter 64 is provided in the 1-2 modification. The beam splitter 62 is the splitter similar to the first beam splitter 30 of the first embodiment. That is, the beam splitter 62 is a mirror having an opening to allow a beam to pass therethrough, and a reflection surface to reflect the incident light to spatially separate the incident light. The beam splitter 64 is a splitter which allows the incident beam to pass through or reflects it in accordance with the polarizing direction of the incident beam. In the 1-2 modification, the laser beam Lw for forming images is polarized to have only the P-component, and the laser beam LR for illuminating the object surface SR (not shown) is polarized to have only the S-component, which will be described later. The beam splitter 64 allows the laser beam Lw, which has only the P-component, to pass therethrough, and reflects the laser beam LR which has only the S-component.

The collimator 60 outputs the laser beam having a single wavelength and having only an S-component. Further, between the collimator 60 and the cylindrical lens 14, a polarization modulator 66 is inserted. The polarization modulator 66 has an element including an electro-optical effect device (hereinafter referred to as an E/O device) 66a provided adjacent to the collimator 60, and a λ/4 plate 66b provided on the cylindrical lens side. The E/O device 66a polarizes the laser beam at a desired angle. That is, the E/O device 66a changes the ratio of the S-component and the P-component. After the polarized condition is changed by the E/O device 66a, the laser beam is directed to the cylindrical lens 14. In the 1-2 modification 10N, only the P-component of the laser beam is modulated in accordance with the image information.

The polarization function of the polarization modulator 66 is described with use of the well-known Poincare's sphere. On the Poincare's sphere, a linearly polarized beam is positioned on the equator. The positions of the linearly polarized beams having only S-component and P-component are apart by 180 degrees along the equator. Positions between the above two positions correspond to linearly polarized beams having certain inclination angles. In other words, a beam corresponding to a position between the above described two positions has either P-component or the S-component at a predetermined ratio. The E/O device 66a moves the beam having only S-component from the equator in the direction where the latitude changes on the Poincare's sphere in accordance with the voltage applied to the E/O device 66a. In other words, the incident laser beam can be converted into a desired elliptically polarized beam which is defined by a longitudinal position on the Poincare's sphere.

For example, when 100% of a predetermined input voltage is applied to the E/O device 66a, the beam on the Poincare's sphere is moved by 180 degrees in the direction where latitude changes, and positioned on the opposite side of the equator. In this case, the polarization direction of the linearly polarized beam is changed from the S-component direction to the P-component direction. If 50% of the voltage is applied, the position on the Poincare's sphere is changed towards the north pole. In this case, the linearly polarized beam is changed to a circularly polarized beam having ellipticity of 90%. If 25 of the voltage is applied to the E/O device 66a, the position is moved by 45 degrees towards the north pole, and thus the linearly polarized beam is changed to an elliptically polarized beam having an ellipticity of 45%.

The λ/4 plate 66b changes the polarization state of the incident laser beam to rotate about a diameter connecting a position corresponding to the S-component and a position corresponding to the P-component on the equator by 90 degrees. Thus, if a laser beam passes through the λ/4 plate 66b, the beam elliptically polarized by the E/O device 66a is converted to a linearly polarized beam having an inclination angle corresponding to the ellipticity. In other words, by varying the voltage applied to the E/O device 66a in accordance with the image information, the image information is converted to the inclination angle of the linearly polarized beam.

As shown in FIG. 21, the intensity of the laser beam outputted by the polarization modulator 66 is indicated by a vector, wherein the vertical axis indicates the intensity of the S-component of beam, the horizontal axis indicates the intensity of the P-component of beam. In the case of FIG. 21, as the time passes from "a" through "e", the voltage applied to the E/O device 66a is changed: 50% of the predetermined voltage is applied at time "a"; 100% at time "b"; 66% at time "c"; 38% at time "d"; and 33% at time "e". In this case, the ellipticity of the converted elliptically polarized beam is: 90% (circularly polarized beam) at time "a"; 180% (linearly polarized beam having only S-component) at time "b"; 120% at time "c"; 70% at time "d"; and 60% at time "e".

The laser beam having the ellipticity as described above passes through the λ/4 plate 66b and is converted into a linearly polarized beam. The inclination angle θ is, as shown in FIG. 21, θa=45 degrees at time "a"; θb=90 degrees at time "b"; θc=60 degrees at time "c"; θd=35 degrees at time "d";

and θe=30 degrees at time "e". Thus, the laser beam is converted into a vector having the P-component and the S-component corresponding to the inclination angle θ when the beam passes through the λ/4 plate 66b.

In FIG. 21, the absolute length of the vector in the linearly polarized state represents the intensity of the beam. This intensity corresponds to the power of the laser beam outputted by the collimator 60. In the 1-2 modification, as shown in FIG. 21, the intensity of the laser beam outputted by the collimator 60 is controlled so that the intensity of the S-component remains constant. Consequently, the intensity of the S-component of the laser beam remains constant as shown in FIG. 22, and the intensity of the P-component of the laser beam changes in accordance with the image information. That is, the P-component of the laser beam is modulated in accordance with the image information.

As described above, the polarization modulator 66 outputs the laser beam, the P-component of which is modulated in accordance with the image information; and the S-component of which is constant. Thus, in the 1-2 modification, the image forming operation is performed based on the P-component of the laser beam, and reading operation is executed with use of the S-component of the laser beam.

In the scanning optical system 10D as the 1-2 modification, the laser beam emitted by the collimator 60 is modulated with respect only to the P-component thereof by the polarization modulator 66, and directed to the cylindrical lens 14. Accordingly, the P-component of the laser beam proceeds as the laser beam Lw to be used for image forming; and the S-component of the laser beam proceeds as the laser beam LR for illuminating the object surface SR.

With the 1-2 modification described above, the reading optical system and the image forming optical system have a common optical path, and independent reading and image forming operations can be executed at the same time. Further, as a light source, only one collimator is required, thus the scanning optical system can be made compact.

In the above described 1-2 modification, as shown in FIGS. 21 and 22, the collimator 60 outputs the laser beam such that the intensity of the S-component of the beam is constant. According to the invention, the intensity of the S-component may change, for example, in accordance with the position where the laser beam scans.

Figure 24:
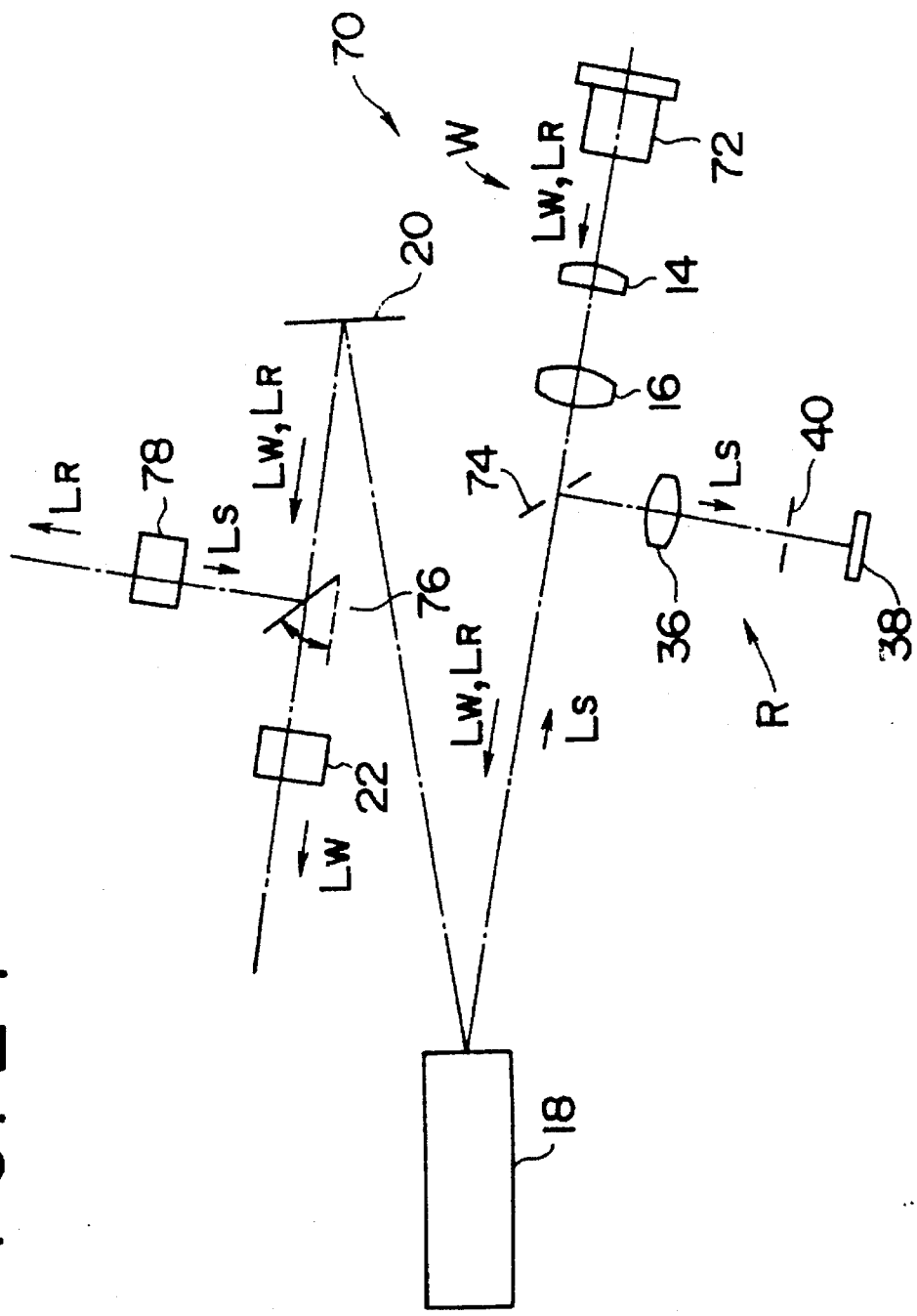
FIG. 24 shows an arrangement of a second embodiment of the scanning optical system in the auxiliary scanning plane.

FIG. 24 shows a scanning optical system 70 as a second embodiment of the present invention.

In the second embodiment, similar to the first embodiment, the image forming optical system W and the reading optical system R have a common optical path. However, in the second embodiment, switching means for switching the image forming operation and reading operation is provided.

The scanning optical system 70 has a collimator 72 which is used commonly in the reading optical system R and in the image forming optical system W. The collimator 72 is capable of outputting a laser beam modulated in accordance with the image information when used in the image forming optical system, and is capable of emitting an unmodulated laser beam when used in the reading optical system R. As a beam splitter, corresponding to the second beam splitter 32 of the first embodiment, a mirror 74 is provided. The mirror 74 is identical to the mirror 30 of the first embodiment and spatially separates beams. As in the first embodiment, the optical axis of the toric lens 22 is displaced with respect to the optical axis of the scanning optical system 70. Between the cylindrical mirror 20 and the toric lens 22, a movable mirror 76, which serves as switching means, is provided. The movable mirror 76 can be located at a retracted position and an inserted position. When the image forming operation is executed, the movable mirror 76 is retracted so as not to interfere with the optical axis of the scanning optical system 70. When the reading operation is executed, the movable mirror 76 is located at the inserted position so that the movable mirror 76 is inserted in the optical axis with being inclined by 45 degrees with respect to the optical axis of the scanning optical system 70. When the movable mirror 76 is located at the inserted position, the laser beam incident to the movable mirror is reflected by the movable mirror 76 and is incident to the object surface SR (now shown) through a toric lens 78.

In the scanning optical system 70, a reading/image forming switch (not shown) is operated and a reading mode or an image forming mode is selected. If the image forming mode is selected, the movable mirror is positioned to the retracted position, and the collimator 72 outputs the modulated laser beam Lw. If the reading mode is selected, the movable mirror 76 is positioned at the inserted position. In the reading mode, the collimator 72 outputs the non-modulated laser beam LR for illuminating the object surface SR. The performance of the laser beam Lw or LR are substantially the same as in the first embodiment except that the reading and image forming operations are executed selectively in the second embodiment.

With the scanning optical system 70 as the second embodiment, the reading optical system R and the image forming optical system W have a common optical path, and common optical elements. Consequently, the construction of the scanning optical system can be simplified, and the system can be made compact, thereby reducing the manufacturing cost.

The reading/image forming select switch can be a manually operated switch, an electronically controlled switch, or switch controlled by a software. For example, a facsimile machine employing the scanning optical system can be made such that when a sending mode is selected, the scanning optical system is switched to perform the reading operation, and when data is received through a line, the scanning optical system is switched to perform the image forming operation.

Figure 25:
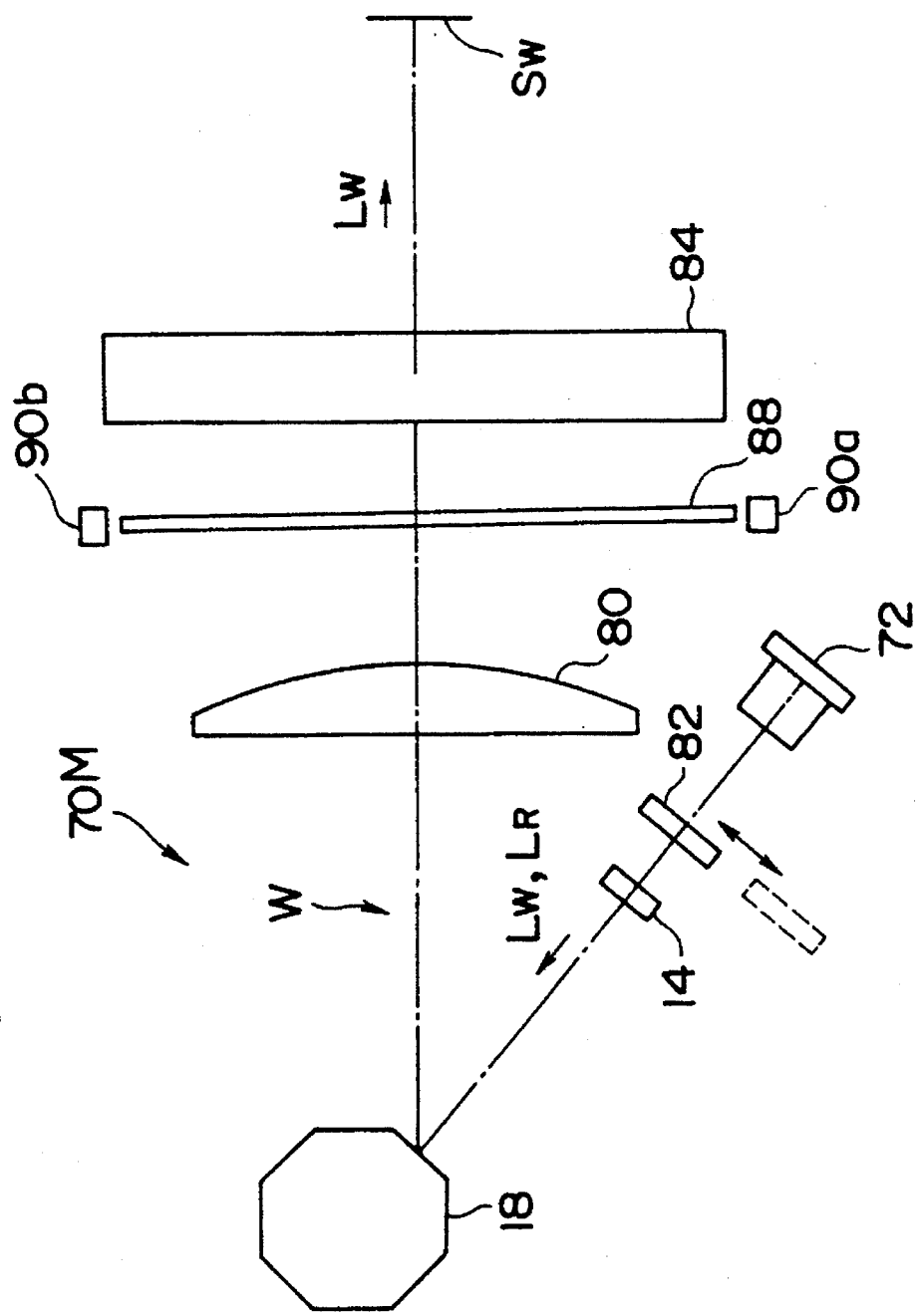
FIG. 25 shows an arrangement of a first modification of the second embodiment of the scanning optical system in the main scanning plane.
Figure 26:
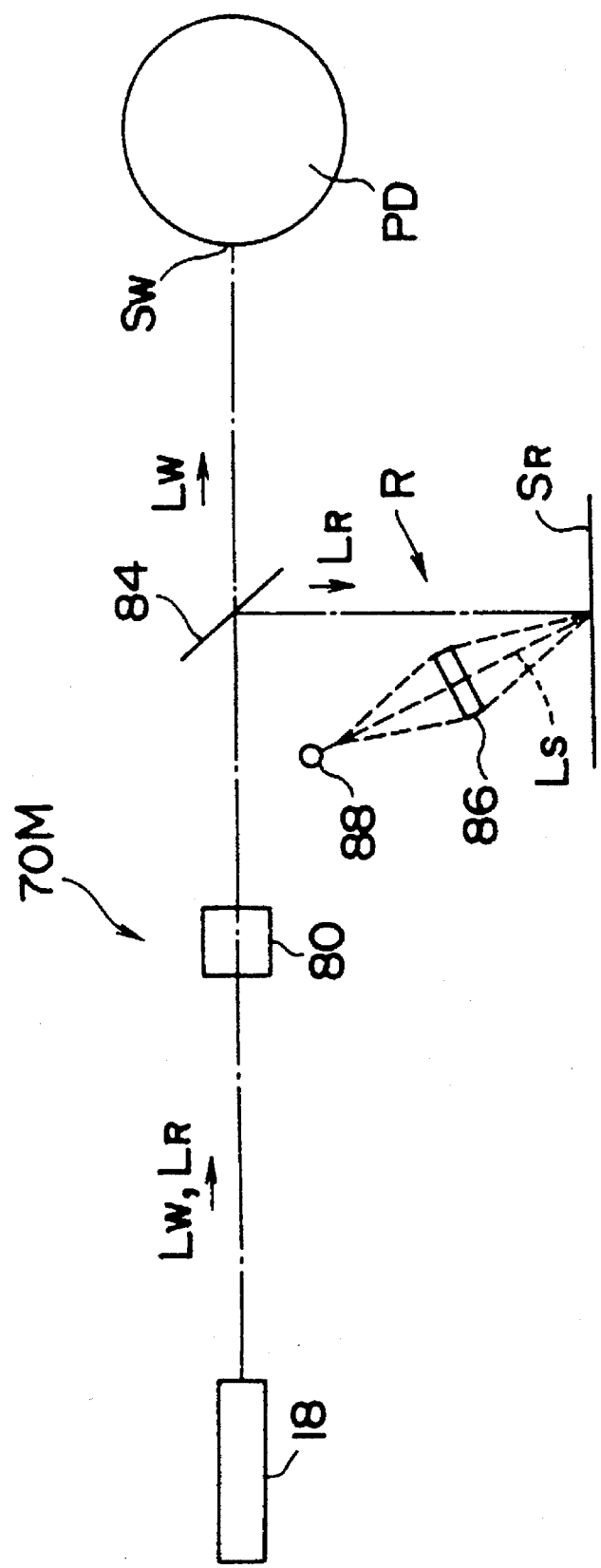
FIG. 26 shows an arrangement of the first modification of the second embodiment in the auxiliary scanning plane.

FIGS. 25 and 26 show a first modification of the second embodiment (2-1 modification). In a scanning optical system 70M of the 2-1 modification, switching means is different than in the second embodiment. Further, in the 2-1 modification, an fθ lens 80 is used instead of the cylindrical mirror 20 of the second embodiment. The laser beam Lw is deflected by the polygonal mirror 18, and is incident to the fθ lens 80. In the 2-1 modification, the optical axes of the laser beam emitted by the collimator 72 and the deflected beam are on the same plane (i.e., the main scanning plane).

The image forming optical system W includes the collimator 72 which emits the P-component of the laser beam with respect to the beam splitter, the cylindrical lens 14, the polygonal mirror 18, and the fθ lens 80. The laser beam Lw (i.e., the P-component of the laser beam emitted by the collimator 72) which passes through the fθ lens 80 scans the surface Sw at a constant speed, and is converged on the surface Sw regardless of the deflection angle thereof.

The reading optical system R includes the collimator 72, the cylindrical lens 14, the polygonal mirror 18, and the fθ lens 80. Further, a λ/2 plate 82 which is retractable with respect to the optical path between the collimator 72 and the cylindrical lens 14 is provided. Between the fθ lens 80 and the destination surface Sw, a beam splitter 84, a cylindrical lens 86, a fluorescent fiber 88, and a pair of light receiving elements 90a and 90b are provided.

The λ/2 plate 82 changes the direction of the polarization. If a P-component beam is incident to the λ/2 plate 82, an S-component beam is outputted. The beam splitter 84 allows the P-component beam to pass therethrough, and reflects the S-component beam. The cylindrical lens 86 is a lens for converging the scattered light Ls reflected on the surface SR to be scanned. The scattered light Ls is focused on the fluorescent fiber 88. The intensity of the scattered light Ls focused on the fluorescent fiber 88 is detected by a pair of light receiving elements provided at the ends of the fluorescent fiber 88.

The cylindrical lens 86 is provided adjacent to the portion of the object surface SR where the laser beam LR scans. The cylindrical lens 86 is a Fresnel lens, and extends in the main scanning direction. The fluorescent fiber 88 also extends along the main scanning direction. In response to the incidence of light, the fluorescent fiber generates fluorescent light, which is introduced to either end, and emitted therefrom. The emitted light is detected by a pair of light receiving elements 90a and 90b. The light receiving elements 90a and 90b are connected to a signal processing device (not shown), and an image information is obtained based upon the amount of light detected by the respective light receiving elements 90a and 90b.

The λ/2 plate 82 is movable between a retracted position and an inserted position. When an image forming operation is executed, the λ/2 plate 82 is located at the retracted position, where the λ/2 plate is retracted from the optical path. The modulated laser beam Lw emitted from the collimator 72 is deflected by the polygonal mirror 18, passes through the fθ lens 80, and scans the destination surface Sw to form an image.

When the reading operation is executed, the λ/2 plate 82 is located in the optical path (i.e., located at the inserted position), and the collimator 72 emits the unmodulated laser beam LR. The polarization condition of the laser beam LR is changed to have an S-component by the λ/2 plate 82, the laser beam LR is deflected by the polygonal mirror 18, passes through the fθ lens 80, is reflected by the beam splitter 84, and is converged on the object surface SR to scan.

As in the 2-1 modification described above, which uses the fθ lens instead of the cylindrical mirror, substantially the same effects as in the second embodiment can be obtained. Further, the beams are separated based upon the polarized direction, and the same optical path can be used by the reading optical system R and the image forming optical system W.

Figure 27:
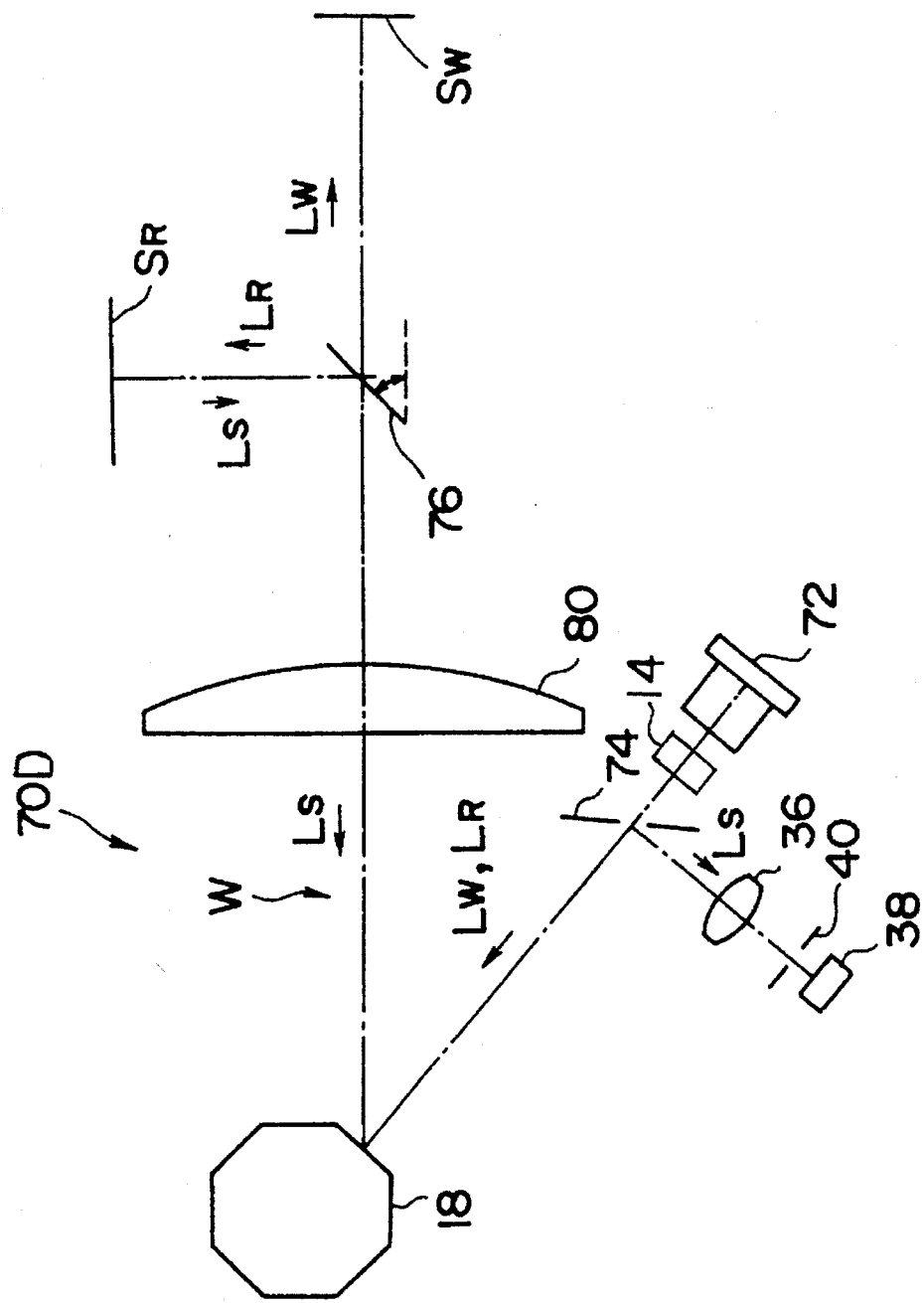
FIG. 27 shows an arrangement of a second modification of the second embodiment of the scanning optical system in the main scanning plane.

FIG. 27 shows a scanning optical system 70D as a second modification of the second embodiment (2-2 modification). In this 2-2 modification, the mirror 74 and movable mirror 76 are used similarly to the second embodiment. Further, the fθ lens 80 is used as in the 2-1 modification.

In the scanning optical system 70D of the 2-2 modification, a reading mode or an image forming mode is selected by a selection switch (not shown). If the image forming mode is selected, the movable mirror 76 is retracted from the optical path as shown in broken line in FIG. 27. The modulated laser beam emitted by the collimator 72 is converged by the cylindrical lens 14 and passes through the opening formed in the mirror 74. The laser beam Lw then deflected by the polygonal mirror 18, passes through the fθ lens 80, and scans the destination surface Sw.

If the reading mode is selected, the movable mirror 76 is positioned at the inserted position as indicated by a solid line in FIG. 27. In the reading mode, the collimator 72 emits the unmodulated laser beam LR, which is converged by the cylindrical lens 14 and passes through the opening of the mirror 74. The laser beam LR is then deflected by the polygonal mirror 18, passes through the fθ lens 80, and is reflected by the movable mirror 76 to scan the object surface SR. The scattered light Ls which is reflected by the object surface SR proceeds along the same path as the path along which laser beam LR proceeds, and is directed towards the beam splitter 74. As aforementioned, the scattered light Ls⁻ is reflected by the reflection surface of the mirror 74, converged by the anamorphic lens 36, and strikes the light receiving element 38.

Described as above, with the 2-2 modification, substantially the same effects can be obtained as with the second embodiment. Since the mirror 74 having an opening can spatially separate the combined beams, the reading optical system and the image forming optical system can use the common optical path.

Figure 28:
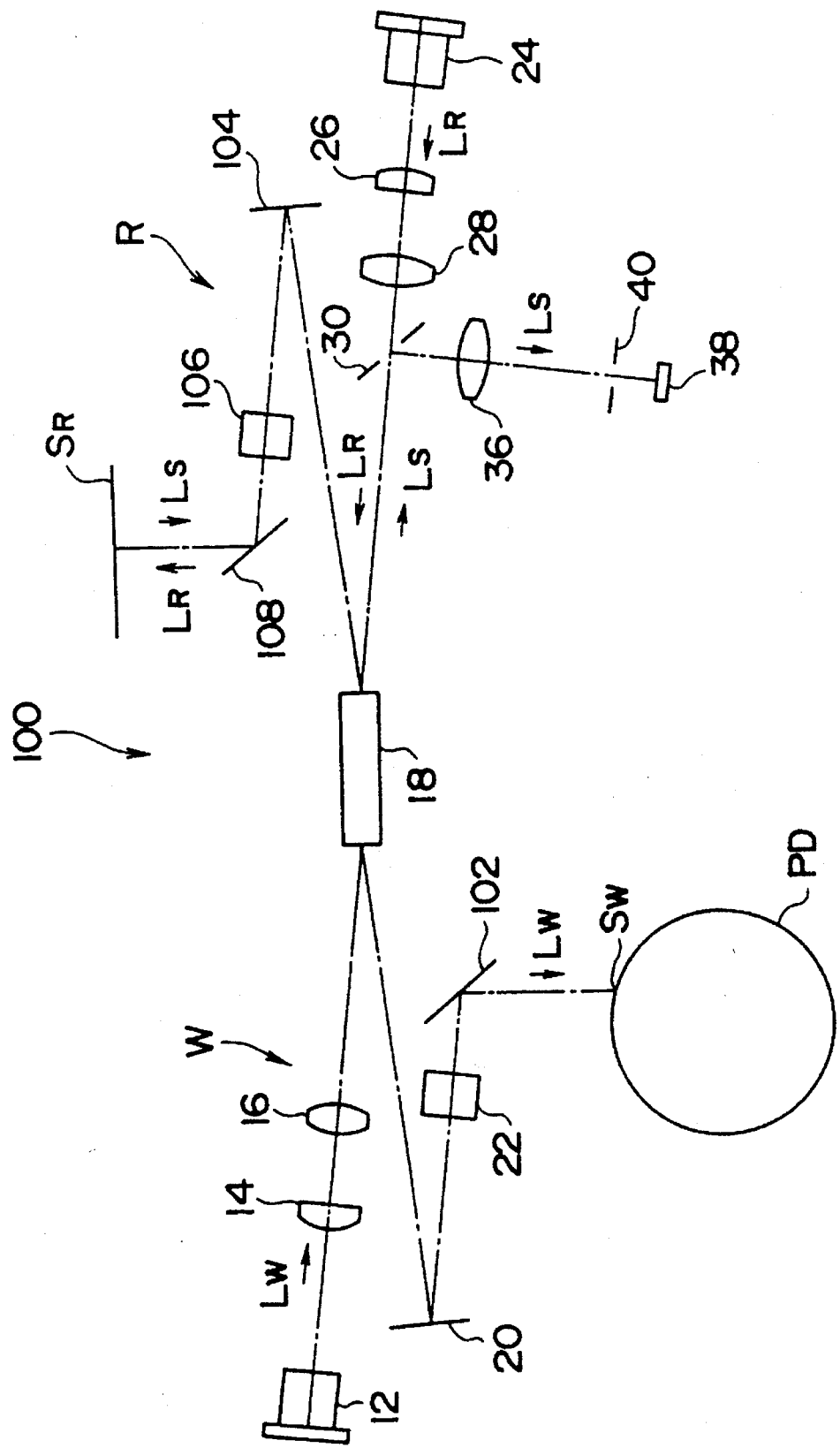
FIG. 28 shows an arrangement of a third embodiment of the scanning optical system in the auxiliary scanning plane.

FIG. 28 shows a scanning optical system 100 as a third embodiment of the present invention. In the third embodiment, the reading optical system R and the image forming optical system W do not have a common optical path. Only the polygonal mirror 18 is commonly used. In the third embodiment, it is possible to perform independent reading and image forming operations at the same time.

FIG. 28 shows an arrangement of the scanning optical system 100 on the auxiliary scanning plane. As shown in FIG. 28, the reading optical system and the image forming optical system are arranged on opposite side with respect to the polygonal mirror 18.

In the image forming optical system W in FIG. 28, the laser beam Lw passes through the toric lens 22, is reflected by a mirror 102 and is directed to the surface Sw. However, the entire construction of the image forming optical system W is substantially the same as the image forming optical system of the first embodiment. As in the first embodiment, the optical axis of the toric lens 22 is displaced with respect to the optical axis of the image forming optical system W. The collimator 12 outputs the laser beam Lw modified in accordance with the image information.

In the reading optical system R in FIG. 28, a cylindrical mirror 104 and a toric lens 106 are used. The function and construction of the cylindrical mirror 104 is identical to the cylindrical mirror 20 in the reading optical system of the first embodiment. The laser beam LR passes through the toric lens 106 and is reflected by a mirror 108 and directed to the surface SR. The function and construction of the toric lens 106 is identical to the toric lens 22 in the first embodiment. As is the foregoing embodiments and modifications, the optical axis of the toric lens 106 is displaced with respect to the optical axis of the reading optical system R. Thus, the reading optical system R is substantially the same as the reading optical system of the first embodiment except that the reading optical system of the third embodiment does not have the optical path commonly used with the image forming optical system W. In the third embodiment, the collimator 24 outputs the unmodulated laser beam LR.

In the reading optical system R of the third embodiment, the laser beam LR passes through the opening 30a, while the scattered light Ls is reflected by the reflection surface 30b (as more explicitly shown in FIG. 6). In view of the cross section of each beam at the position where the mirror 30 is located, the scattered light Ls is much wider in area than the laser beam LR. Accordingly, if the opening 30a is formed to be as small as possible within the range where the laser beam LR is not eclipsed, substantially all of the scattered light Ls is reflected by the mirror 30. In other words, since the laser beam LR and the scattered light Ls are spatially separated, the intensity of each beam is not substantially reduced. Further, by modifying the size and shape of the reflection surface 30b, the intensity of light received by the light receiving element 38 can be changed.

With use of the scanning optical system 100, the reading operation and the image forming operation can be performed independently of each other. Further, since a single polygonal mirror is used as a common optical element both in the reading optical system and in the image forming optical system, the manufacturing cost can be reduced.

Figure 29:
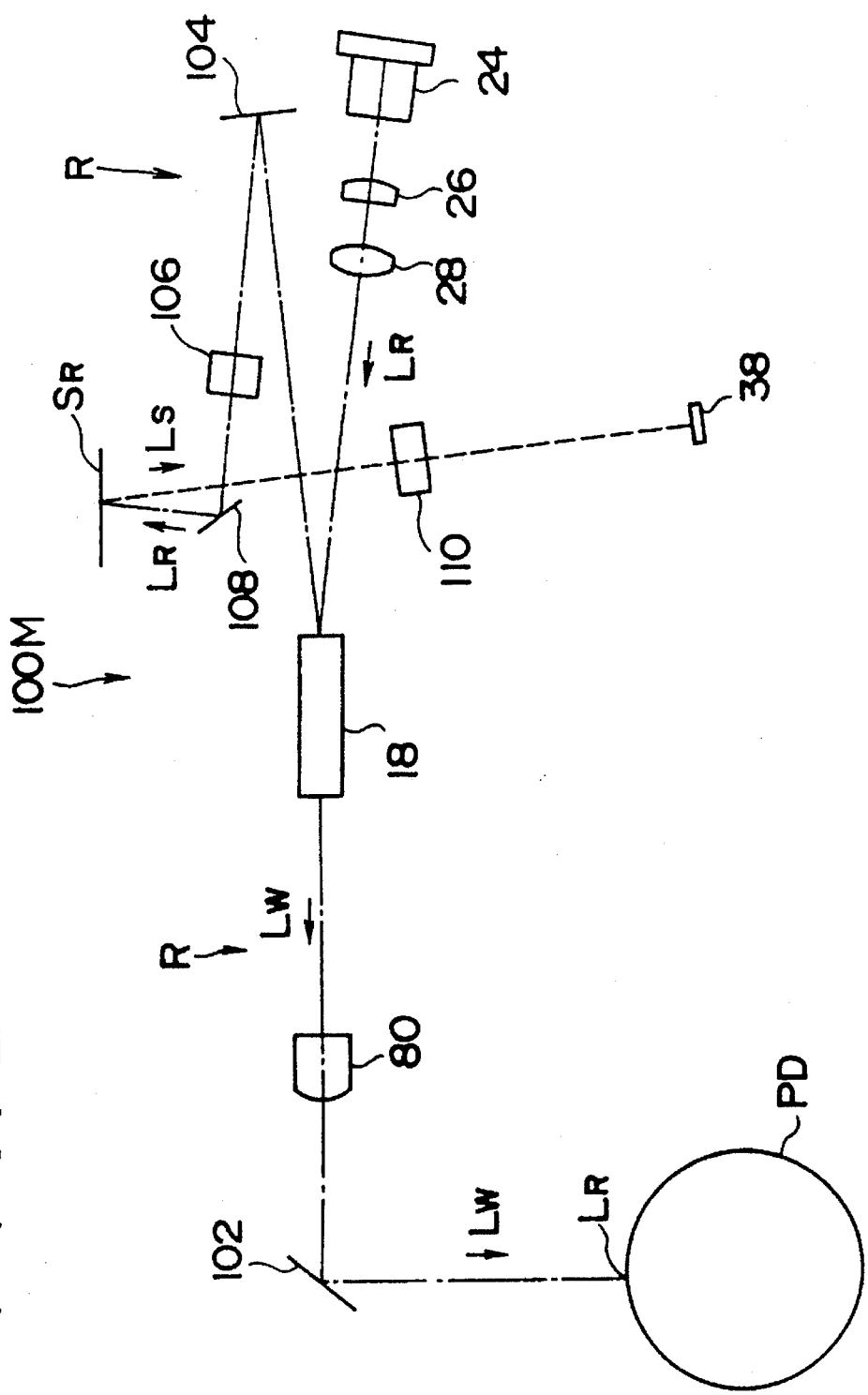
FIG. 29 shows an arrangement of a first modification of the third embodiment along the auxiliary scanning plane.
Figure 30:
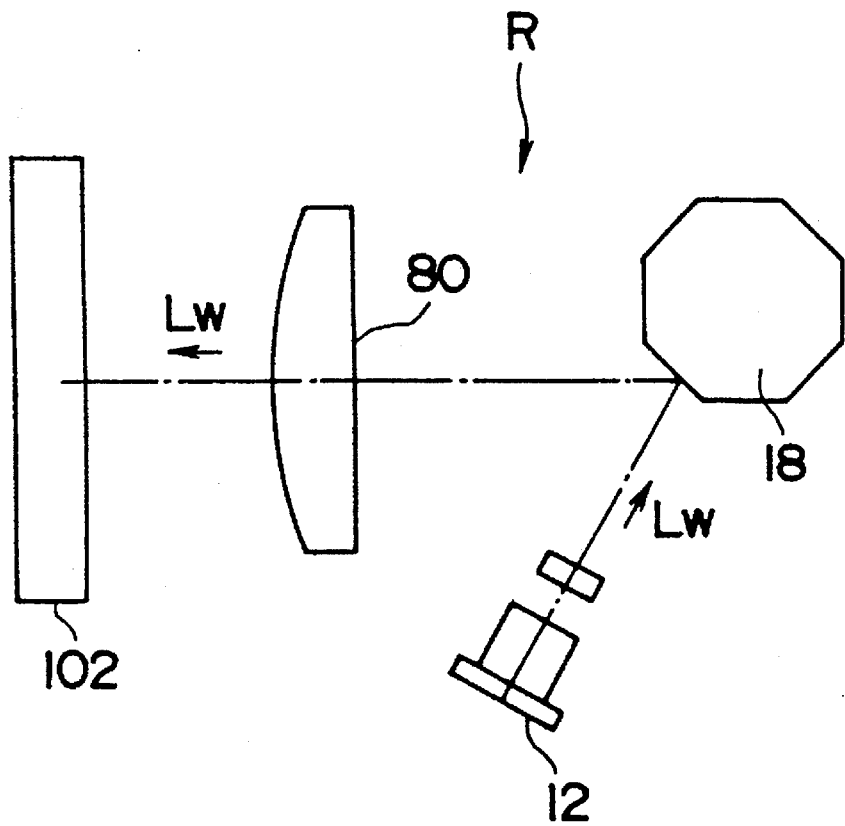
FIG. 30 shows an arrangement of the first modification of the third embodiment in the main scanning plane.

FIGS. 29 and 30 show a scanning optical system 100M as a first modification of the third embodiment (3-1 modification).

In the image forming optical system W of the 3-1 modification, the fθ lens 80 is used instead of the cylindrical mirror.

In the reading optical system R of the 3-1 modification, the mirror 108, a convergence lens 110, and the light receiving element are arranged such that the scattered light Ls (i.e., the light reflected from the surface SR) does not proceed along the same optical path as the path along which the incident beam proceeds. As shown in FIG. 29, along a path scattered light Ls proceeds the different from the path of the incident laser beam LR in the auxiliary scanning direction. The scattered light Ls from the object surface SR is converged by the lens 110 and focused on the light receiving element 38.

In the 3-1 modification, the beam splitter is omitted with respect to the third embodiment. Further, since the resolution of the reading optical system depends on the laser beam LR, it is not necessary to use a lens having a relatively high quality lens such as the lens 110.

Figure 31:
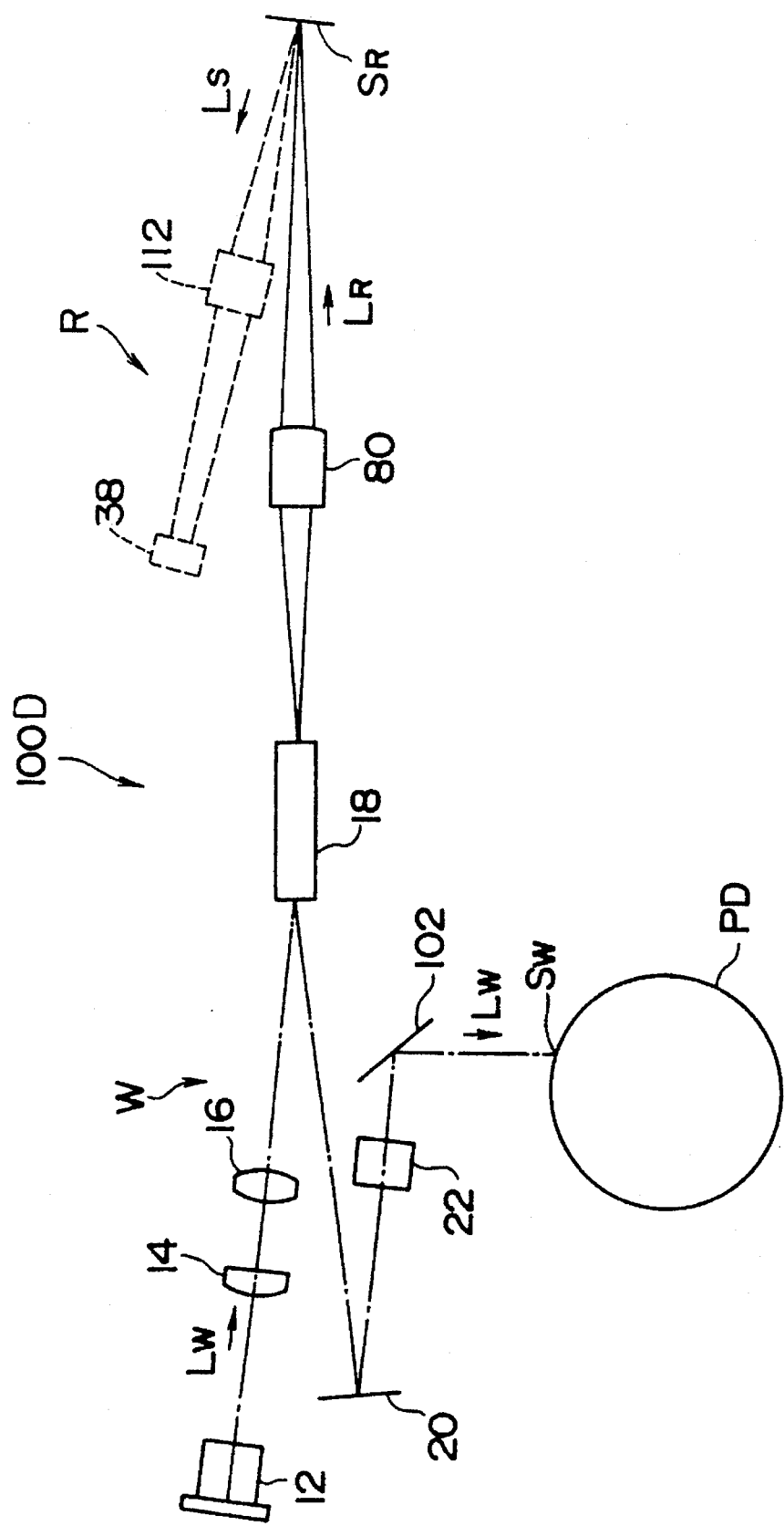
FIG. 31 shows an arrangement of a second modification of the third embodiment of the scanning optical system in the auxiliary scanning plane.
Figure 32:
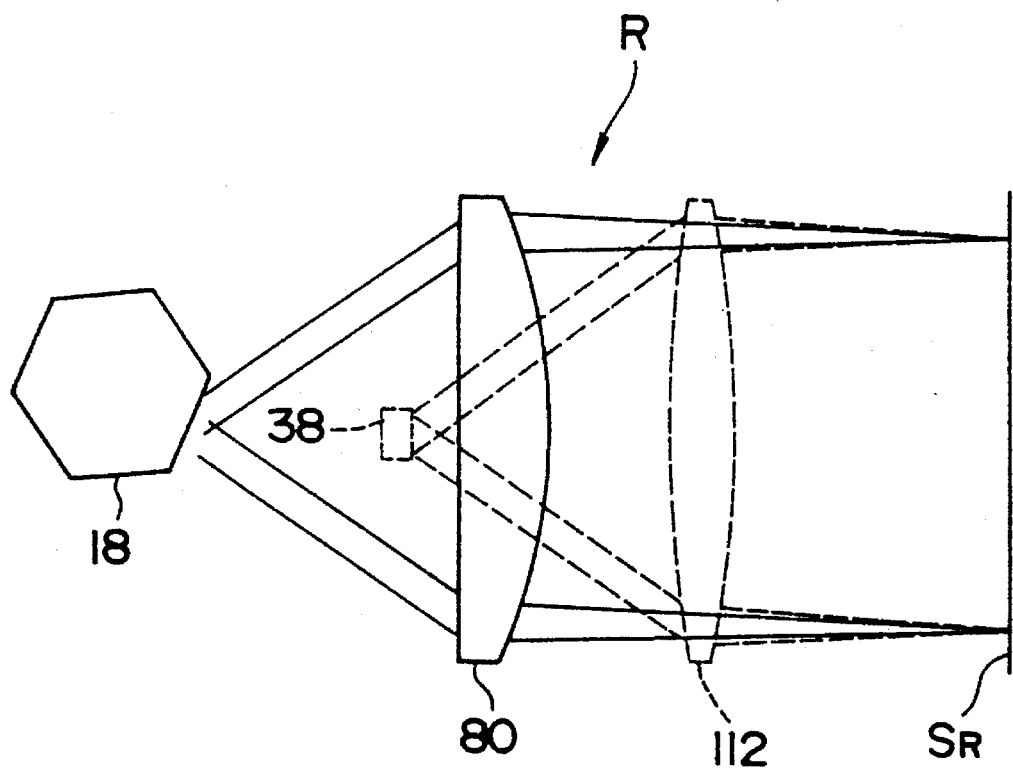
FIG. 32 shows an arrangement of the second modification of the third embodiment in the main scanning plane.

FIGS. 31 and 32 show a scanning optical system 100D as a second modification of the third embodiment (3-2 modification).

In the 3-2 modification, the image forming optical system W uses the cylindrical mirror 20, and the reading optical system uses the fθ lens 80. In the 3-2 modification, the fθ lens 80 has a telecentric character. Accordingly, the direction of the peak of the scattered light Ls becomes perpendicular to the object surface SR. The scattered light Ls is converged on the light receiving element 38 by a condenser lens 112. Thus, the intensity of the beam received by the light receiving element 38 becomes even within the scanning area. Further, the object surface SR having large regular reflection component can be read.

Figure 33:
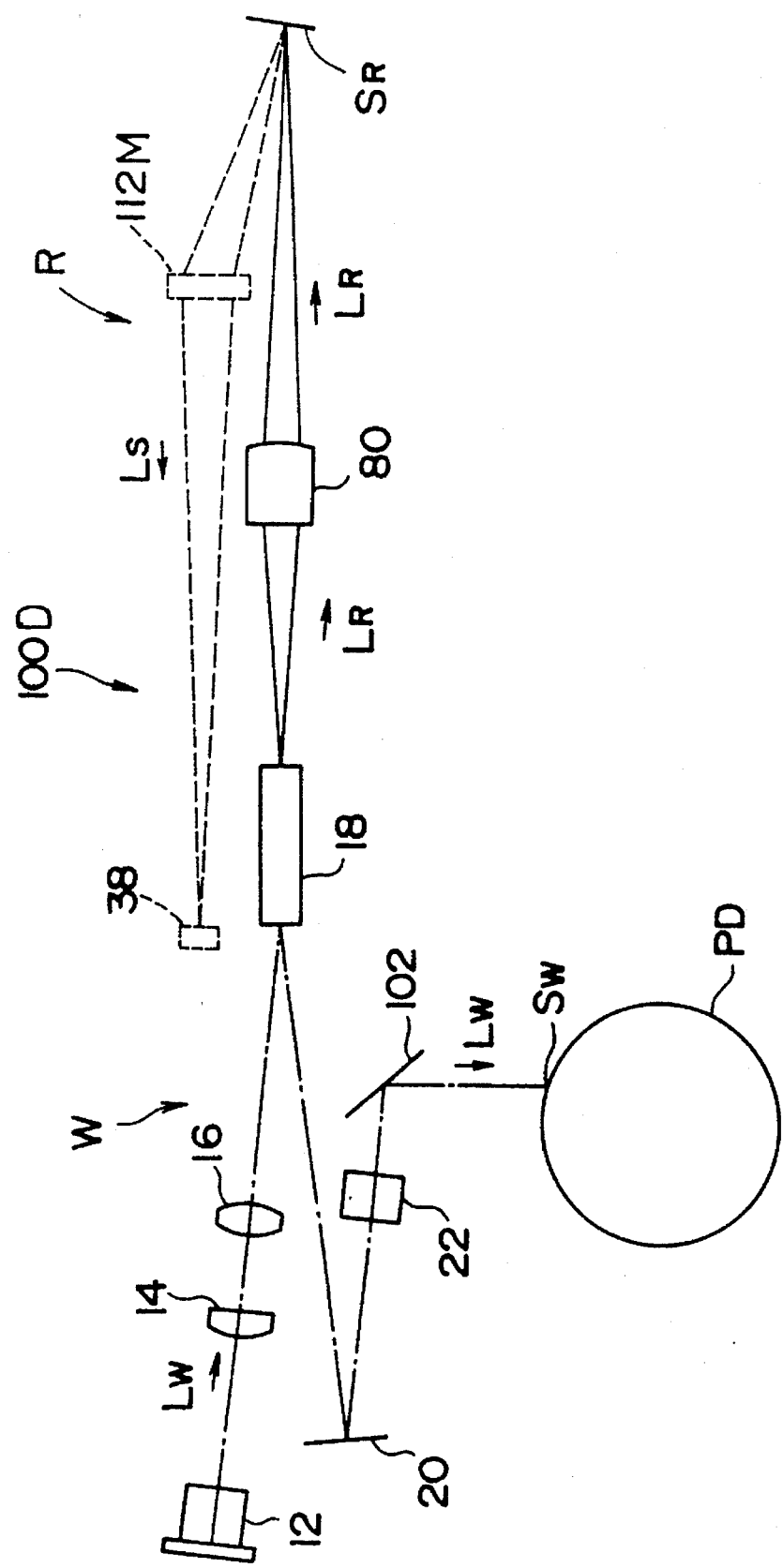
FIG. 33 shows an arrangement of the third modification of the third embodiment in the auxiliary scanning plane.

FIGS. 33 and 34 show a third modification (3-3 modification) in which a non-telecentric fθ lens is used. In this arrangement, the lens 112D is an anamorphic Fresnel lens, and is constructed to receive the beam from an area broader than the scanning area. With this construction, a non-telecentric lens can be used, and accordingly, the manufacturing cost can be reduced.

Figure 35:
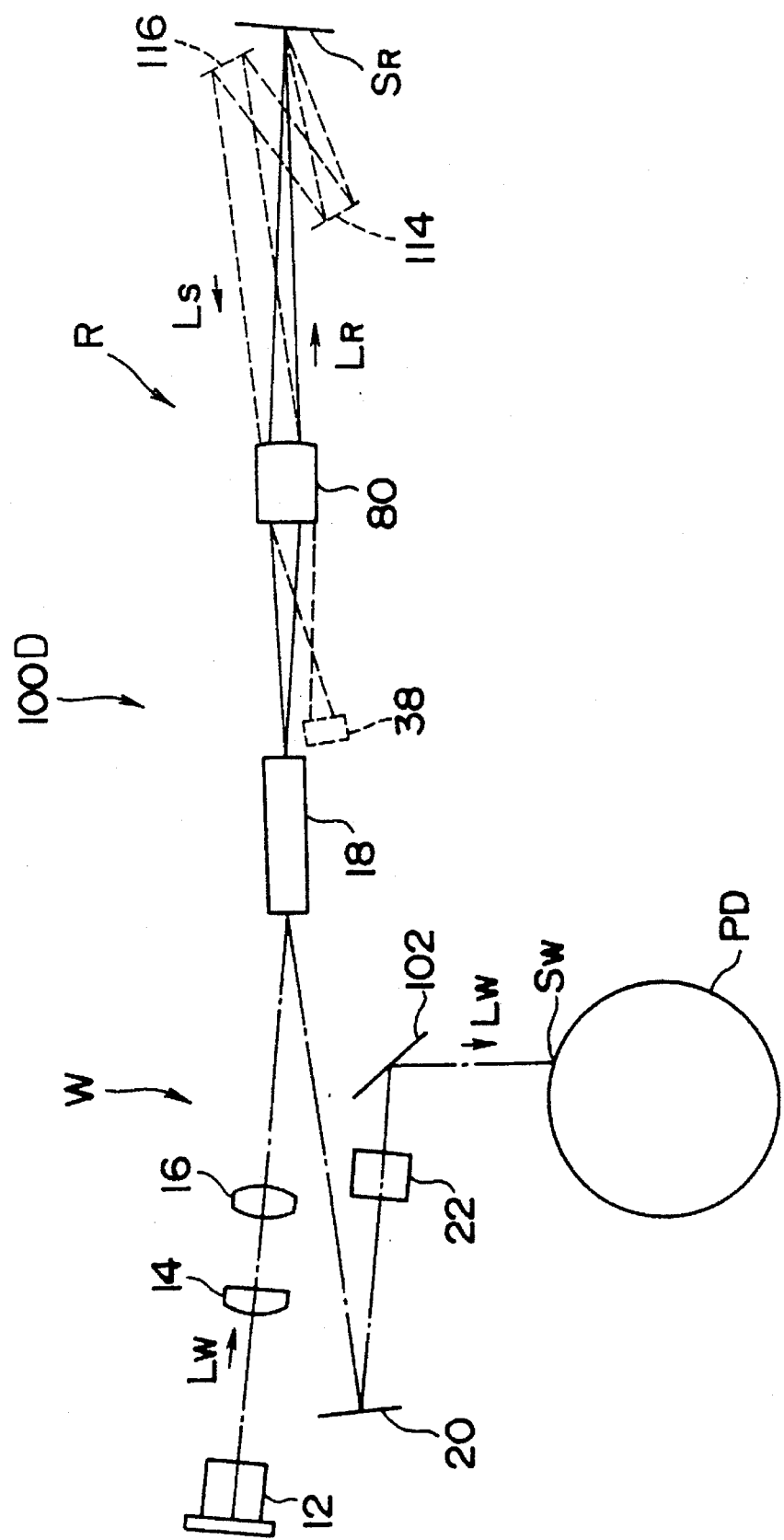
FIG. 35 shows an arrangement of the fourth modification of the third embodiment in the auxiliary scanning plane.

FIGS. 35 and 36 show a fourth modification (3-4 modification) of the third embodiment. In the 3-4 modification, the scattered light Ls is converged by a curved mirror 114, and is deflected to another mirror 116. The scattered light Ls then passes through the fθ lens 80 and converges on the light receiving element 38. In this 3-4 modification, the optical axis of the laser beam LR and the optical axis of the light Ls are different in the auxiliary scanning direction.

In the 3-4 modification, the image forming optical system W uses the cylindrical mirror 20. It is of course possible to use the fθ lens instead of the cylindrical mirror.

FIG. 38 shows an arrangement of a scanning optical system 200 as a fourth embodiment. In the scanning optical system 200, the image forming optical system W has a similar construction to that of the image forming optical system in the first embodiment. In the reading optical system R of the fourth embodiment, the object surface SR is illuminated by a light source 210 which has a plurality of wavelengths. More specifically, the light source outputs incoherent light, which has a continuous spectral distribution. The light source 210 includes a fluorescent lamp 201 extending in the main scanning direction, and a reflection plate 202 extending parallel to the lamp 201.

In the image forming optical system W, the collimator 12 outputs the laser beam Lw having a wavelength λ1. In this fourth embodiment, the wavelength λ1 is longer than any wavelength included in the light outputted by the fluorescent lamp 201. Further, the second beam splitter 32 and the third beam splitter 34 respectively have dichroic mirrors which allow the beam having the wavelength λ1 to pass through, and which reflect the light of the visible range.

With the scanning optical system 200 constructed as above, the laser beam Lw outputted by the collimator 12 passes through the cylindrical lens 14 and the objective lens 16 and converges in both the main scanning direction and auxiliary scanning direction. Since the second beam splitter 32D allows the beam having the wavelength λ1 to pass therethrough, the laser beam Lw is incident to the polygonal mirror 18 at a predetermined inclined angle in the auxiliary scanning direction. The optical axis of the incident beam intersects the rotational axis of the polygonal mirror 18.

The laser beam Lw deflected by the polygonal mirror 18 is incident to the cylindrical mirror 20 at a predetermined inclined angle in the auxiliary scanning direction, and is reflected to enter the toric lens 22. The laser beam Lw passes through the toric lens 22 and then through the beam splitter 34D, and is directed to the destination surface Sw.

The light outputted from the light source 210 is reflected and scattered by the object surface SR. Scattered light Ls is directed to the beam splitter 34D. Since the scattered light Ls has continuous spectral distribution in the visible range, it is reflected by the beam splitter 34D and directed to the second beam splitter 32D by way of the toric lens 22, the cylindrical mirror 20, and the polygonal mirror 18.

The beam splitter 32D also reflects the scattered light Ls, and the light Ls is then converged by the anamorphic lens 36, and received by the light receiving element 38. Thus, the reading operation is performed.

As described above, in the fourth embodiment, the reading operation and the image forming operation can be performed independently from each other. Further, since the object surface SR is illuminated with the light having a plurality of wavelengths, images of any color can be read. Furthermore, since the reading optical system R mainly consists of mirror type optical elements, chromatic aberration can be avoided, and therefore, light having a plurality of wavelengths can be used for illuminating the object surface SR.

The reading optical system R of the fourth embodiment can be used in the foregoing scanning optical systems.

As described above, according to the present invention, there is provided a scanning optical system including a reading and image forming optical system, which can execute independent reading and image forming operations at the same time.

Further, according to the-invention, the reading optical system and image forming optical system have a common optical path and/or common optical elements. Consequently, the apparatus can be made compact, and the manufacturing cost can be reduced.

Furthermore, according to the present invention, a scanning optical system free from noise or ambient light can be provided.

Still further, a noise generated by one of the reading optical system or the image forming optical system may not be incident to the other.

Furthermore, in the scanning optical system according to the present invention, beams are spatially separated. Thus, the intensity of each of the separated beams may not be reduced due to the separation.

The present disclosure relates to subject matters contained in Japanese Patent Application No. HEI 5-26074, filed on Jan. 20, 1993, and another Japanese Patent Application, entitled Scanning Optical System, filed on Jan. 19, 1994, the number of which has not been assigned, which are expressly incorporated herein by reference in its entirety.

What is claimed is:

1. A scanning optical system, comprising:
   an image forming optical system including means for emitting a writing beam modulated in accordance with image information;
   means for deflecting said writing beam to scan a destination surface;
   means for emitting a reading beam to scan an object surface;
   means for combining optical paths of said writing beam toward said destination surface and said reflected light of said reading beam from said object surface toward said deflecting means, along a common optical path, wherein said means for combining is located between said means for deflecting and said destination surface; and
   a reading optical system including means for receiving said light reflected from said object surface to obtain image information of said object surface, said means for deflecting said writing beam also deflecting reflected light from said object surface, and said light receiving means disposed along the optical path of said reflected light after said deflecting means; and
   means for diverting said light reflected from said object surface, after deflection by said deflecting means, said diverting means separating said reflected light from said common optical path toward said light receiving means.

2. The scanning optical system according to claim 1, wherein said image forming optical system comprises a laser source for emitting a laser beam carrying said image information and wherein said reading optical system comprises a light source for illuminating said object surface.

3. The scanning optical system according to claim 2, wherein said light source comprises another laser source for outputting another laser beam to illuminate said object surface.

4. The scanning optical system according to claim 3, further comprising means for combining said laser beam and said another laser beam and means for dividing a combined laser beam into said laser beam and said another laser beam.

5. The scanning optical system according to claim 4, wherein said laser beam and said another laser beam have different wavelengths, and wherein each of said combining means and said dividing means comprises at least one beam splitter for selectively allowing a beam to pass therethrough or to reflect in accordance with the wavelength of the beam.

6. The scanning optical system according to claim 4, wherein said laser beam carrying said image information and said another laser beam illuminating said object surface are polarized in different directions, and wherein each of said combining means and said dividing means comprises at least one beam splitter for selectively allowing a beam to pass therethrough or reflect therefrom in accordance with the polarized direction of the beam.

7. The scanning optical system according to claim 3, wherein said means for diverting said light reflected from said object surface comprises a mirror member having a transparent portion which allows said another laser beam to pass therethrough, and a reflection portion for reflecting said light from said object surface toward said light receiving means.

8. The scanning optical system according to claim 7, wherein said reading optical system comprises a lens inserted in an optical path between said object surface and said light receiving means to converge said reflected light by said object surface towards said light receiving means.

9. The scanning optical system according to claim 8, wherein said reading optical system comprises a light shielding member located at a conjugate position with respect to said object surface to inhibit light not from said object surface from being incident to said light receiving means.

10. The scanning optical system according to claim 2, wherein said light source outputs light having a plurality of wavelengths.

11. The scanning optical system according to claim 10, wherein said light source comprises a fluorescent lamp.

12. The scanning optical system according to claim 10, wherein said light source comprises another laser source for outputting a plurality of combined laser beams having different wavelengths.

13. The scanning optical system according to claim 10, further comprising at least one means for allowing said laser beam to pass therethrough, and for reflecting said plurality of wavelengths outputted by said light source.

14. The scanning optical system according to claim 13, wherein said laser beam has a wavelength greater than each of said plurality of wavelengths outputted by said light source.

15. The scanning optical system according to claim 1, wherein said image forming optical system comprises a light source for outputting a modulated beam which is modulated in accordance with image information, wherein said reading optical system comprises another light source for outputting an illuminating beam for illuminating the object surface, and wherein said deflecting means comprises a deflection mirror for deflecting said modulated beam, said reflected light and said illuminating beam.

16. The scanning optical system according to claim 15, further comprising at least one common element located between said deflection mirror and said destination surface in said image forming optical system, and located between said deflection mirror and said object surface in said reading optical system.

17. The scanning optical system according to claim 16, wherein said at least one common element comprises an fθ lens.

18. The scanning optical system according to claim 16, wherein said at least one common element comprises a curved mirror which functions as an fθ lens.

19. The scanning optical system according to claim 18, wherein said at least one common element further comprises an anamorphic lens provided between said curved mirror and said destination surface in said image forming optical system.

20. The scanning optical system according to claim 19, wherein an optical axis of said anamorphic lens is displaced with respect to an optical axis of said image forming optical system.

21. The scanning optical system according to claim 18, wherein said curved mirror comprises means for absorbing ambient light.

22. The scanning optical system according to claim 1, comprising a single laser source for use in said image forming optical system and said reading optical system, wherein said single laser source outputs a modulated beam which is modulated in accordance with image information, and outputs an illuminating beam for illuminating the object surface, wherein said deflecting means comprises a deflection mirror for deflecting said modulated beam, said reflected light and said illuminating beam.

23. The scanning optical system according to claim 22, wherein said single laser source outputs a modified laser beam for forming an image, and outputs an unmodified laser beam for illuminating said object surface.

24. The scanning optical system according to claim 23, further comprising switching means for switching the optical path of the laser beam outputted by said single laser source in accordance with whether said single laser source is used in said image forming optical system or in said reading optical system.

25. The scanning optical system according to claim 23, further comprising:
means for polarizing the beam emitted by said single laser source in different directions depending on whether said laser source is used in said image forming optical system or in said reading optical system;
and means for changing an optical path of a beam in accordance with the polarized direction of the beam incident thereto.

26. The scanning optical system according to claim 22, wherein said image forming optical system comprises means for modulating a laser beam emitted by said single laser source with respect to a predetermined polarized direction thereof.

27. The scanning optical system according to claim 26, further comprising means for separating said modulated laser beam and said illumination beam incident thereto and combined.

28. The scanning optical system according to claim 27, wherein said separating means comprises a beam splitter for allowing an incident beam to pass therethrough or to reflect in accordance with the polarized direction thereof.

29. The scanning optical system according to claim 1, wherein said reading optical system comprises a light source for emitting an illuminating beam for illuminating said object surface, and a common optical path, wherein said illuminating beam and said light reflected from said object surface pass along said common optical path.

30. The scanning optical system according to claim 1, wherein said reading optical system further comprises a light source for emitting another beam to illuminate said object surface; and
wherein said scanning optical system further comprises means for combining said writing beam and said another beam along a common optical path.

31. The scanning optical system according to claim 30, further comprising means for separating said writing beam and said another beam from said common optical path to direct said writing beam and said another beam toward said destination surface and said object surface, respectively.

32. The scanning optical system according to claim 30, wherein said means for combining said optical paths of said writing beam and said reflected light from said object surface, along a common optical path, further comprises said means for separating said writing beam and said another beam from said common optical path.

33. The scanning optical system according to claim 1, further comprising a toric lens through which said common optical path passes.

34. The scanning optical system according to claim 33, wherein said toric lens is located between said means for deflecting said writing beam and said means for combining said scanning beam and said reflected light from said object surface.

35. The scanning optical system according to claim 33, wherein an optical axis of said toric lens is displaced with respect to an optical axis of said scanning optical system.

36. The scanning optical system according to claim 1, wherein said means for combining optical paths of said writing beam and said reflected light from said object surface, further comprises means for switching between an image forming operation and a reading operation.

37. The scanning optical system according to claim 36, wherein said means for switching comprises a movable mirror capable of being place in an inserted position along said common optical path, and a retracted position out of said optical path.

38. The scanning optical system according to claim 36, further comprising an fθ lens located between said means for deflecting and said means for switching, along said common optical path.

39. A scanning optical system, comprising:
image forming optical system for emitting a writing beam modulated in accordance with an image information onto a destination surface;
means for deflecting said writing beam to scan a destination surface, said deflecting means rotating to scan the destination surface;
means for emitting a reading beam to scan an object surface; and
a reading optical system including means for receiving light reflected from said object surface to obtain an image information of said object surface, said means for deflecting said writing beam also deflecting said reflected light from said object surface, and said light receiving means disposed along an optical path of said reflected light after said deflecting means,
wherein a predetermined optical path is used by both the writing beam and the reflected light.

40. The scanning optical system according to claim 39, wherein a predetermined optical path and at least one optical element is used in either of said image forming optical system and said reading optical system.

41. The scanning optical system according to claim 40, wherein said at least one optical element comprises a curved mirror for reflecting the beam deflected by said deflecting means towards said destination surface, said curved mirror having power in a direction where said writing beam scans, the beam reflected by said curved mirror and having a predetermined angle with respect to a beam incident thereto in the direction—perpendicular to the direction in which said writing beam scans.

42. The scanning optical system according to claim 40, wherein said at least one optical element comprises a laser source capable of emitting a laser beam modulated by said image information and another laser beam for illuminating said object surface.

43. The scanning optical system according to claim 42, wherein said laser source comprises a light source for emitting a laser beam polarized in a first polarization direction, and modulating means for modulating said laser beam emitted by said laser source to have a component polarized in a second polarization direction, said component in said second polarization direction being modulated in accordance with said image information.

44. The scanning optical system according to claim 43, wherein said light from said object surface proceeds along the same optical path as said another laser beam proceeds, and wherein said reading optical system comprises a first beam splitter for spatially separating said light from said object surface from said optical path along which the light proceeds.

45. The scanning optical system according to claim 44, wherein said reading optical system comprises a second beam splitter which selectively allows a beam to pass through or reflects the same in accordance with the polarized direction thereof.

46. The scanning optical system according to claim 45, wherein said second beam splitter reflects a beam polarized in said first polarization direction, and allows a beam polarized in said second polarization direction to pass therethrough.

47. The scanning optical system according to claim 39, wherein said image forming optical system comprises a light source for emitting a laser beam modulated by said image information, and wherein said reading optical system comprises another light source for emitting another laser beam for illuminating said object surface.

48. The scanning optical system according to claim 47, wherein each of said light source and said another light source emits a laser beam having a single wavelength.

49. The scanning optical system according to claim 47, wherein said light source emits a plurality of beams having different wavelengths and having respective image information, wherein said another light source emits a plurality of beams having different wavelengths, wherein said destination surface has sensitivity for a plurality of wavelengths so as to form a color image, and wherein the reading optical system comprises means for separating said light from said object surface into a plurality of lights having respective wavelengths, and a plurality of sensor members for receiving said plurality of lights.

50. The scanning optical system according to claim 47, wherein said light from said object surface proceeds along the same optical path as said another laser beam proceeds, and wherein said reading optical system comprises a first beam splitter for spatially separating said light from said object surface from said optical path along which the light proceeds.

51. The scanning optical system according to claim 47, wherein said reading optical system comprises a second beam splitter for combining said laser beam and said another laser beam into a combined beam, and a third beam splitter for dividing said combined beam into said laser beam and said another laser beam.

52. The scanning optical system according to claim 51, wherein said light source emits said laser beam having a first predetermined wavelength, and said another light source emits said another laser beam having a second predetermined wavelength, and each of said second and third beam splitters allows a beam to pass therethrough or reflects a beam in accordance with the wavelength of the beam incident thereto.

53. The scanning optical system according to claim 52, wherein said second and third beam splitters allow a beam having said first predetermined wavelength to pass through, and reflect a beam having said second predetermined wavelength.

54. The scanning optical system according to claim 51, wherein said light source comprises a collimator which emits a laser beam polarized in a first polarization direction, and said another light source comprises another collimator which emits a laser beam polarized in a second polarization direction, and wherein said second and third beam splitters selectively allow a beam to pass therethrough or reflect the same in accordance with the polarized direction thereof.

55. The scanning optical system according to claim 54, wherein said second and third beam splitters allow a beam polarized in said first polarization direction to pass therethrough, and reflect a beam polarized in said second polarization direction.

56. The scanning optical system according to claim 39, wherein a component of a beam of light passes through an optical element provided in said scanning optical system without being reflected therein, and any component of said beam which is outputted from said optical element after being reflected inside said optical element proceeds along a different optical path than an optical path along which the unreflected beam component proceeds.

57. The scanning optical system according to claim 56, wherein an optical axis of said optical element is displaced with respect to an optical axis of said beam passing through said optical element.

58. A scanning optical system, comprising:
an image forming optical system for emitting a scanning beam modulated in accordance with image information onto a destination surface;
means for deflecting said scanning beam toward said destination surface;
a reading optical system including means for receiving light reflected from an object surface to obtain an image information of said object surface, wherein said image forming optical system and said reading optical system are selectively used; and
means for switching an optical path depending on whether said image forming optical system is used or said reading optical system is used,
wherein a predetermined optical path and at least one optical element including said means for deflecting, are commonly used in said image forming optical system and by said means for receiving light reflected from an object surface.

59. The scanning optical system according to claim 58, wherein said means for deflecting comprises a deflection mirror, and said at least one optical element further comprises a curved mirror for reflecting the beam deflected by said deflection mirror towards said destination surface, said curved mirror having power in a direction where said scanning beam scans, the beam reflected by said curved mirror having a predetermined angle with respect to a beam incident thereto in the direction perpendicular to the direction in which said scanning beam scans.

60. The scanning optical system according to claim 58, wherein said at least one optical element comprises a laser source capable of selectively emitting said scanning beam and another laser beam for reflecting off said object surface.

61. The scanning optical system according to claim 60, wherein said switching means comprises a movable member capable of being moved between a reading position where said movable member directs said another beam to said object surface, and an image forming position where said movable member directs said scanning beam to said destination surface.

62. The scanning optical system according to claim 61, wherein said movable member is located at said image forming position when said light source emits said scanning beam, and is located at said reading position when said light source emits said another laser beam.

63. The scanning optical system according to claim 60, wherein said light source emits a beam polarized in a first polarization direction, and wherein said scanning optical system further comprises polarization changing means provided between said deflection mirror and said light source, for changing the polarized direction of a light source beam such that when one of said scanning beam or said another laser beam is emitted, the polarized direction of the laser beam emitted by said light source is not changed, and when the other of said scanning beam and said another laser beam is emitted, the polarized direction of the laser beam is changed to a second polarized direction, and wherein said scanning optical system further comprises a beam splitter provided between said deflection mirror and said destination surface, said beam splitter allowing a laser beam polarized in one of said first direction or said second direction to pass therethrough and reflecting a laser beam polarized in the other of said first direction or said second direction.

64. The scanning optical system according to claim 58, wherein said at least one optical element further comprises an fθ lens.

65. The scanning optical system according to claim 60, wherein said reading optical system comprises light receiving means for receiving the light emitted from said object surface through an anamorphic lens, an optical path of said light emitted from said object surface being different from the path of said another laser beam.

66. The scanning optical system according to claim 65, wherein said light receiving means comprises a fluorescent fiber for receiving light to generate fluorescent light which is emitted towards side ends thereof, and a pair of sensors for detecting the intensity of said fluorescent light emitted from said side ends of said fluorescent fiber.

67. A scanning optical system according to claim 58, said deflecting means deflecting light reflected from an object surface toward said light receiving means.

68. A scanning optical system, comprising:
an image forming optical system for emitting a scanning beam modulated in accordance with image information onto a destination surface; and
a reading optical system for illuminating an object surface with light having a plurality of wavelengths including means for receiving light reflected from an object surface, said light receiving means comprising a plurality of detectors for receiving reflected light of a plurality of wavelengths from said object surface to obtain image information of said object surface; and
means for deflecting said scanning beam modulated in accordance with an image information, toward a destination surface, said means for deflecting said scanning beam also deflecting said light reflected from said object surface, toward said light receiving means,
wherein a predetermined optical path and at least one optical element is used both in said image forming optical system and for receiving said reflected light from said object surface.

69. The scanning optical system according to claim 68, wherein said at least one optical element comprises means for deflecting said scanning beam modulated in accordance with image information onto a destination surface; and
wherein said reflected light from said object surface is reflected by said means for deflecting said scanning beam modulated in accordance with an image information onto a destination surface.

70. A scanning optical system, comprising:
an image forming optical system for emitting a scanning beam modulated in accordance with image information onto a destination surface;
a reading optical system for illuminating an object surface with light having a plurality of wavelengths and for receiving reflected light from said object surface to obtain image information of said object surface; and
means for switching an optical path depending on whether said image forming optical system is used or said reading optical system is used,
wherein a predetermined optical path and at least one optical element is commonly used in processing both said scanning beam and said reflected light.

71. The scanning optical system according to claim 70, wherein said at least one optical element comprises means for deflecting said scanning beam modulated in accordance with image information onto a destination surface; and
wherein said reflected light from said object surface is reflected by said means for deflecting said scanning beam modulated in accordance with an image information onto a destination surface.

72. A scanning optical system, comprising;
an image forming optical system for emitting a scanning beam modulated in accordance with image information onto a destination surface; and
a reading optical system for illuminating an object surface with light having a plurality of wavelengths including means for receiving light reflected from an object surface, said light receiving means comprising a plurality of detectors for receiving reflected light of a plurality of wavelengths from said object surface to obtain image information of said object surface;
wherein a predetermined optical path and at least one optical element is used both in said image forming optical system and for receiving said reflected light from said object surface.

73. The scanning optical system according to claim 72, wherein said at least one optical element comprises means for deflecting said scanning beam modulated in accordance with image information onto a destination surface; and
wherein said reflected light from said object surface is reflected by said means for deflecting said scanning beam modulated in accordance with an image information onto a destination surface.

74. A scanning optical system, comprising:
a light source for emitting a beam of light; deflection means for deflecting said beam of light to scan on an object surface;
means for reflecting light from said object surface along a common optical path with said beam of light;
means for receiving light reflected from said object surface, said light receiving means receiving light deflected by said deflecting means and reflected by said reflecting means; and
dividing means for spatially dividing said beam of light emitted by said light source and a reflected beam which is deflected by said deflecting means and reflected by said reflecting means.

75. The scanning optical system according to claim 74, which further comprises a light receiving element for receiving said reflected beam divided by said dividing means.

76. The scanning optical system according to claim 74, wherein said dividing means comprises a mirror member having a transparent portion for allowing said beam of light to pass through, and a reflection portion for reflecting said reflected beam.

77. A scanning optical system, comprising:
a light source for emitting a beam of light;

deflection means for deflecting said beam of light to scan on an object surface and to deflect a reflected beam of light from said object surface;

light receiving means for receiving said reflected beam from said object surface; and lens means provided between said object surface and said light receiving means for converging said reflected beam, wherein an optical axis of a deflected beam incident to said object surface and an optical axis of said reflected beam forms a predetermined angle in a direction perpendicular to a direction along which said deflected beam scan on said object surface.

78. The scanning optical system according to claim 77, wherein said deflection means deflects said reflected beam prior to reception of said reflected light by said light receiving means.

* * * * *

UNITED STATES PATENT AND TRADEMARK OFFICE
CERTIFICATE OF CORRECTION

PATENT NO. : 5,596,424
DATED : January 21, 1997
INVENTOR(S) : T. IIZUKA et al.

It is certified that error appears in the above-indentified patent and that said Letters Patent is hereby corrected as shown below:

At column 29, line 45 (claim 29, line 5), change "light reflected" to ---reflected light---.

At column 30, line 33 (claim 39, line 11), delete "an".

At column 32, line 29 (claim 58, line 8), delete "an". (second occurrence).

Signed and Sealed this

Twenty-eighth Day of July, 1998

Attest:

BRUCE LEHMAN

Attesting Officer

Commissioner of Patents and Trademarks